US010846724B2

(12) United States Patent
Lutnick et al.

(10) Patent No.: US 10,846,724 B2
(45) Date of Patent: *Nov. 24, 2020

(54) GAME AT CASH REGISTER

(71) Applicant: CFPH, LLC, New York, NY (US)

(72) Inventors: Howard W. Lutnick, New York, NY (US); Geoffrey M. Gelman, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,710

(22) Filed: Oct. 1, 2019

(65) Prior Publication Data
US 2020/0027107 A1 Jan. 23, 2020

Related U.S. Application Data

(63) Continuation of application No. 16/161,721, filed on Oct. 16, 2018, now Pat. No. 10,467,643, which is a
(Continued)

(51) Int. Cl.
*A63F 9/24* (2006.01)
*A63F 13/00* (2014.01)
(Continued)

(52) U.S. Cl.
CPC ....... *G06Q 30/0209* (2013.01); *G06Q 20/202* (2013.01); *G06Q 20/327* (2013.01);
(Continued)

(58) Field of Classification Search
CPC .............. G07F 17/323; G07F 17/3237; G07F 17/3244; G07F 17/3262
See application file for complete search history.

(56) References Cited

U.S. PATENT DOCUMENTS 6,656,046 B1 * 12/2003 Yoseloff .............. G07F 17/3213
463/16
6,935,952 B2   8/2005 Walker et al.
(Continued)

FOREIGN PATENT DOCUMENTS

JP    2001216381 A    8/2001
JP    2002015197       1/2002
(Continued)

OTHER PUBLICATIONS

U.S. Appl. No. 11/678,573, filed Feb. 2007, Lutnick et al.
(Continued)

*Primary Examiner* — Kang Hu
*Assistant Examiner* — Jason Pinheiro

(57) ABSTRACT

In various embodiments, a method may include receiving an indication of a price of an item to be purchased by a person from a merchant, receiving an indication of an amount tendered by the person, determining an amount of change due to the person based on the price and based on the amount tendered, determining the rules of a game, generating a first outcome of the game using a random number generator, determining based on the rules whether the first outcome is winning or losing, authorizing, if the first outcome is winning, that the amount tendered be returned to the person and that the person be allowed to keep the item, and authorizing, if the first outcome is losing, that the amount tendered be kept by the merchant.

16 Claims, 13 Drawing Sheets

Related U.S. Application Data continuation of application No. 15/350,668, filed on Nov. 14, 2016, now Pat. No. 10,127,770, which is a continuation of application No. 13/300,828, filed on Nov. 21, 2011, now Pat. No. 9,495,829, which is a continuation of application No. 12/815,011, filed on Jun. 14, 2010, now Pat. No. 8,062,116, which is a continuation of application No. 11/678,573, filed on Feb. 23, 2007, now Pat. No. 7,780,522.

(51) Int. Cl.
| | |
|---|---|
| G06F 17/00 | (2019.01) |
| G06Q 30/02 | (2012.01) |
| G07F 17/32 | (2006.01) |
| G07F 5/24 | (2006.01) |
| G06Q 20/38 | (2012.01) |
| G06Q 20/20 | (2012.01) |
| G06Q 20/32 | (2012.01) |

(52) U.S. Cl.
CPC ............ *G06Q 20/387* (2013.01); *G07F 5/24* (2013.01); *G07F 17/32* (2013.01); *G07F 17/323* (2013.01); *G07F 17/329* (2013.01); *G07F 17/3223* (2013.01); *G07F 17/3225* (2013.01); *G07F 17/3237* (2013.01); *G07F 17/3241* (2013.01); *G07F 17/3244* (2013.01); *G07F 17/3253* (2013.01); *G07F 17/3255* (2013.01); *G07F 17/3272* (2013.01)

(56) References Cited

U.S. PATENT DOCUMENTS

| | | | |
|---|---|---|---|
| 7,040,987 | B2 | 5/2006 | Walker et al. |
| 7,140,964 | B2 | 11/2006 | Walker et al. |
| 7,780,522 | B2 | 8/2010 | Lutnick et al. |
| 8,062,116 | B2 | 11/2011 | Lutnick et al. |
| 9,495,829 | B2 | 11/2016 | Lutnick et al. |
| 10,127,770 | B2 | 11/2018 | Lutnick et al. |
| 2002/0147040 | A1 | 10/2002 | Walker et al. |
| 2002/0147049 | A1 | 10/2002 | Carter |
| 2002/0151366 | A1 | 10/2002 | Walker et al. |
| 2003/0134672 | A1* | 7/2003 | Fulton .................. G07F 17/32 463/17 |
| 2003/0207708 | A1* | 11/2003 | Sadri .................. G06Q 20/04 463/17 |
| 2006/0025201 | A1* | 2/2006 | Van Asdale ............ G07F 17/32 463/20 |
| 2006/0246994 | A1 | 11/2006 | Walker et al. |
| 2007/0008599 | A1 | 1/2007 | Lee |
| 2008/0207296 | A1 | 8/2008 | Lutnick et al. |
| 2011/0059784 | A1 | 3/2011 | Lutnick et al. |
| 2017/0061736 | A1 | 3/2017 | Lutnick et al. |
| 2019/0066139 | A1 | 2/2019 | Lutnick et al. |

FOREIGN PATENT DOCUMENTS

| | | |
|---|---|---|
| JP | 2002175488 | 6/2002 |
| JP | 2003038854 | 2/2003 |
| JP | 2003178194 | 6/2003 |
| JP | 2004280221 | 10/2004 |
| JP | 2004536638 | 12/2004 |
| JP | 2005-276093 | 10/2005 |
| JP | 2005276093 A | 10/2005 |
| JP | 2005310181 | 11/2005 |
| JP | 6392936 | 8/2018 |

OTHER PUBLICATIONS

U.S. Appl. No. 12/815,011, filed Jun. 2010, Lutnick et al.
Notification of Transmittal of the International Search report and the Written Opinion of the International Searching Authority for International Application No. PCT/US2008/054761; 9 pages; Jul. 11, 2008.
International Preliminary Report on Patentability for International Application No. PCT/US2008/054761, dated Aug. 26, 2009 (7 pages).
Australian Examination Report for Application No. 2008218165, dated Jul. 30, 2010 (2 pages).
Australian Notice of Acceptance for Application No. 2008218165, dated Feb. 17, 2011 (3 pages).
Australian Examination Report for Application No. 2011202482; dated Jan. 27, 2012 (2 pages).
JP Office Action for Application No. 2009-551036; dated Oct. 16, 2012 (4 pages).
Australian Examination Report for Application No. 2012202955 dated Oct. 2, 2013 (2 pages).
Canadian Examination Report for Application No. 2,678,880 dated Oct. 19, 2011 (3 pages).
Canadian Examination Report for Application No. 2,678,880 dated Sep. 16, 2013 (4 pages).
Canadian Examination Report for Application No. 2,678,880 dated Nov. 27, 2014 (5 pages).
JP Office Action for Application No. 2009-551036; dated Nov. 5, 2013 (6 pages).
JP Office Action for Application No. 2009-551036; dated Jul. 1, 2014 (10 pages).
JP Office Action for Application No. 2009-551036; dated Jan. 27, 2015 (4 pages).
Australian Exam Report for Application No. 2015203714 , dated May 19, 2016 (3 pages).
JP Office Action w/English Translations for Application No. 2015-107630 ; dated May 10, 2016 (3 pages).
Australian Notice of Acceptance for Application No. 2015203714 , dated May 19, 2017 (3 pages).
Australian First Examiners Report for Application No. 2017203345, dated Feb. 21, 2018 (3 pages).
Canadian Examination Report for Application No. 2,678,880 dated Apr. 17, 2018 (7 pages).
Australian First Examiners Report for Application No. 2017213505, dated May 22, 2018; (3 pages).
JP Office action for Application No. 2017-01058; dated Apr. 3, 2018; 6 pages (w/English translations).

* cited by examiner

GAME AT CASH REGISTER

CROSS-REFERENCE TO RELATED APPLICATIONS

This application is a continuation of U.S. patent application Ser. No. 16/161,721 filed on filed on Oct. 16, 2018, which is a continuation of U.S. patent application Ser. No. 15/350,668 filed on filed on Nov. 14, 2016 (now U.S. Pat. No. 10,127,770), which is a continuation of Ser. No. 13/300,828 Nov. 21, 2011 (now U.S. Pat. No. 9,495,829 which issued on Nov. 15, 2016) which is also a continuation of U.S. patent application Ser. No. 12/815,011, which was filed on Jun. 14, 2010 (now U.S. Pat. No. 8,062,116 issued on Nov. 22, 2011), which is yet a further continuation of U.S. patent application Ser. No. 11/678,573, which was filed Feb. 23, 2007 (now U.S. Pat. No. 7,780,522 which issued on Aug. 24, 2010), all of which are hereby incorporated by reference herein in their entireties.

BRIEF DESCRIPTION OF THE FIGURES

FIG. 11(*b*) is a flow diagram of a particular method of using the portable gaming device by a player, according to some embodiments.

DETAILED DESCRIPTION

Figure 1:
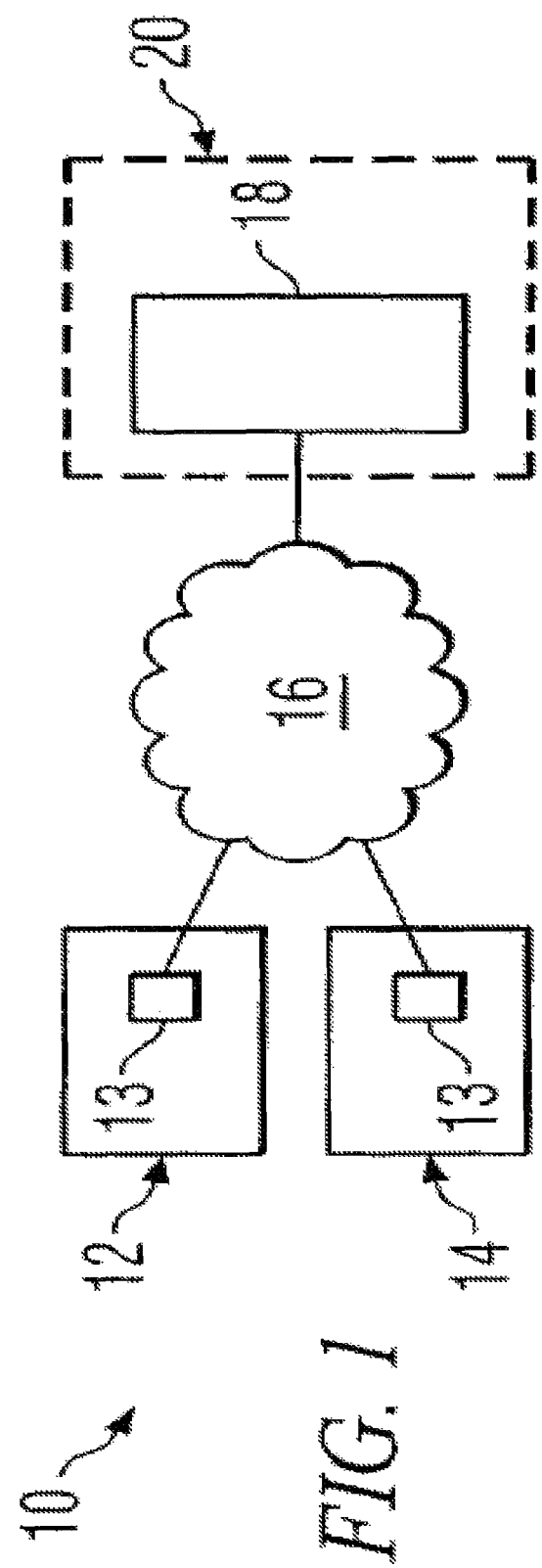
FIG. 1 shows a gaming system according to some embodiments.

As described herein, there are a variety of ways in which one device may detect the presence of another device. In various embodiments, a distance between two devices may be determined. The distance between two devices may be determined in a variety of ways.

In various embodiments, a first position of a first device and second position of a second device may be determined. The distance between the two devices may then be determined through mathematical formulas, such as through the Pythagorean theorem, or using other methods.

In various embodiments, a signal from a first device may be received at a second device. The signal may have well-known attenuation characteristics. For example, the signal strength may depend in a well-established way on the distance from the first device. Thus, by measuring the signal strength at the second device, it may be determined how far the first device is from the second device. As will be appreciated, other characteristics of the signal besides the signal strength may be used to determine distance.

In various embodiments, a signal emitted from a first device may have a limited range (e.g., a range of up to 10 feet). Thus, if the signal is detected at the second device, it may be determined that the second device is within 10 feet of the first device.

In various embodiments, it may be determined which of a set of devices is closes to a particular device. In various embodiments, it may be determined which POS terminal is closes to a mobile gaming device. This determination may be made as follows, in various embodiments. A distance may be determined between the particular device and between one or more of the set of devices. The shortest of the distances determined may then be determined. The device of the set of devices that corresponded to the shortest distanced may then be determined to be the closest device of the set of devices to the particular device. In this fashion, for example, it may be determined which POS terminal in a retail store is closest to a mobile gaming device.

In various embodiments, it may be determined whether a mobile gaming device is within a particular threshold range of a POS terminal. For example, it may be determined whether a mobile gaming device is within 20 feet of a POS terminal. To this end, in various embodiments, the distance between the mobile gaming device and the POS terminal may be determined. The distance may then be compared to the threshold. If the distance is less than the threshold, then the mobile gaming device may be determined to be within the threshold range of the POS terminal.

In various embodiments, one of the mobile gaming device or the POS terminal may contain a short range communication device, such as an RFID tag. If the short range communication device can be detected by the POS terminal or the mobile gaming device, as appropriate, then it may be determined that the two devices are within a threshold range of one another. In various embodiments, short range communication device is separate from both the mobile gaming device and the POS terminal. For example, the device is in the ceiling of a store. In this case, if the device is detectable by both the POS terminal and the mobile gaming device then it may be determined that the POS terminal and the mobile gaming device are within a threshold range of one another. In various embodiments, if the short range communication device is detectable by only the mobile gaming device, then it may be determined that the mobile gaming device is within a threshold range of the POS terminal. For example, it may already be established how far from the POS terminal the short range communication device is.

In various embodiments, it may be desirable to determine which mobile gaming device should interact with which POS terminal. In various embodiments, it is desirable that a mobile gaming device should interact with the nearest POS terminal, or with a POS terminal that is within a certain range of the mobile gaming device. However, there may be two or more POS terminals which are each approximately the same distance from the mobile gaming device, or which are each within the range of the mobile gaming device. In this case, a tie-breaking scheme may be used to determine the particular POS terminal with which the mobile gaming device will communicate. In various embodiments, one of the POS terminals is chosen at random. In various embodiments, a first POS terminal is chosen over a second POS terminal for communication with the mobile gaming device if the first POS terminal is not currently involved in a transaction or in some other activity. In various embodiments, a first POS terminal is chosen over a second POS terminal if the first POS terminal is further away from other mobile gaming devices than is the second POS terminal. In various embodiments, the first POS terminal is always chosen over the second POS terminal. For example, there may be a predetermined priority scheme for choosing POS terminals. In various embodiments, a first POS terminal is chosen over a second POS terminal if the first POS terminal has an employee working at the first POS terminal, and/or if a particular employee is working at the first POS terminal. A POS terminal may thus be chosen based on which employee is working at the POS terminal.

In various embodiments, it is desirable that a POS terminal should interact with the nearest mobile gaming device, or with a mobile gaming device which is within a predetermined range of the POS terminal. However, two or more mobile gaming devices may be approximately the same distance away from the POS terminal, or may both be within a predetermined range of the POS terminal. Thus, a tie-breaking scheme may be used to choose one of the two mobile gaming devices which will communicate with the POS terminal. In various embodiments, the mobile gaming device which had first arrived within a predetermined distance of the POS terminal may be chosen. In various embodiments, the mobile gaming device with the highest credit balance may be chosen. A credit balance may include a balance of gaming credits, a balance useable only for retail purchases, or a balance with any other purpose. In various embodiments, a mobile gaming device may be chosen based on the gaming histories of players with the mobile gaming devices. For example, the mobile gaming device of the person who has played the most games at the casino may be chosen. In various embodiments, the mobile gaming device may be chosen based on the purchasing histories of the people with the mobile gaming devices. For example, the mobile gaming device of the player who has previously made the most purchases at a merchant may be chosen.

In various embodiments, multiple mobile gaming devices may be within a predetermined range of multiple POS terminals. For example, three mobile gaming devices may each be within 30 feet of each of two POS terminals. As another example, two mobile gaming devices may each be within 30 feet of each three POS terminals. In such cases, various criteria (such as those described above) may be used to determine which POS terminals should communicate with which mobile gaming devices. Various combinations of POS terminals communicating with mobile gaming devices may be simulated. For each combination, each pair of mobile gaming device communicating with POS terminal may be evaluated according to the criteria. For example, each pair may be scored against the criteria and the scores added up to generate an overall score for the combination. The combination with the highest overall score may then be chosen.

In various embodiments, once a POS terminal and a mobile gaming device have been matched (i.e., chosen to communicate), then the POS-mobile gaming device pair may be identified. The mobile gaming device may receive a signal with an indication of the POS terminal with which it will be (or is) in communication. The POS terminal may receive a signal with an indication of the mobile gaming device with which it will be (or is) in communication. The choice of which POS terminal and which mobile gaming device will communicate may come from the casino server, a POS terminal (e.g., the POS terminal chosen), the mobile gaming device (e.g., the mobile gaming device chosen), a retail server, or from some other device. The device which has made the choice may inform the POS terminal chosen, the mobile gaming device chosen, the casino server, and/or a retail server. The POS terminal and the mobile gaming device may, once chosen, provide some indicator perceptible by a human. For example, lights on both the POS terminal and the mobile gaming device may flash in the same color. In this way, the player of the mobile gaming device may know with which POS terminal he is communicating by looking to see which POS terminal has colored lights that match the colored lights of his mobile gaming device.

In various embodiments, once a POS terminal and a mobile gaming device have been matched, a communication channel may be opened up between them. For example, one or both devices may be provided with a set of protocols by which to communicate. Such protocols may dictate, for example, particular bit sequences or particular encryption methods to be used in the communication. In various embodiments, the communication channel may simply arise as an antenna (e.g. an antenna on the POS terminal) is rotated so that it points at the matched mobile gaming device. As will be appreciated, there are many other ways in which a communications channel may be opened up between a mobile gaming device and a POS terminal.

In various embodiments, a communications channel may be exclusive to the mobile gaming device, the POS terminal, or both. For example, once the mobile gaming device begins communicating with the POS terminal, the mobile gaming device may be prevented from communicating with other POS terminals. Similarly, the POS terminal may be prevented from communicating with other mobile gaming devices.

In various embodiments, a mobile gaming device can communicate with more than one POS terminal, and/or a POS terminal can communicate with more than one mobile gaming device, but an actual transaction (e.g., purchase) with one must be completed before initiating a transaction with another.

In various embodiments, a mobile gaming device and a POS terminal may detect one another directly. For example, a receiver on the POS terminal may directly detect a signal emitted from the mobile gaming device. However, further information about the devices may be received via the devices respective networks. For example, the mobile gaming device may communicate to another device in the casino network (e.g., to the casino server) what the player's current credit balance is. The casino server may in turn communicate the credit balance to a retail server, which may in turn communicate the credit balance to the POS terminal. Similarly, the mobile gaming device may receive data about the POS terminal (or the retail establishment in which the POS terminal resides) through the casino network. The POS terminal may communicate data, such as the price of an item, to a retail server. The retail server may communicate such data to a casino server. The casino server may in turn communicate such data to the mobile gaming device. The mobile gaming device may then display such data for the player's viewing, for example.

POS

A point of sale (POS) terminal (also a "cash register") may include a device for managing transactions at a retailer or other merchant. A POS terminal may handle product purchases and product returns. A POS terminal may also be used for a variety of other functions. A POS terminal may be used to track inventory, to store cash, to track cash, to store or track other items (e.g., customer checks; e.g., coupons), to track employee working hours, to provide instructions to employees, to provide messages to customers, to send and receive verbal communications (e.g., to send and receive verbal communications between an employee and a manager), to process credit card transactions, to verify a customer's identity (e.g., to receive a customer biometric; e.g., to receive identifying information from a customer, transmit the identifying information to a central service for verification, and receiving a verification signal from the central service), to perform accounting functions, and/or for any other suitable purpose.

A POS terminal may include a processor, memory, a display device, a media input device (e.g., a DVD drive; e.g., a USB drive) an input device (e.g., buttons), an enclosure (e.g., for storing and protecting cash), a printer (e.g., for receipts and coupons), a speaker or other audio output device, a transmitter for transmitting electromagnetic signals, a receiver for receiving electromagnetic signals, a microphone or other audio input device for detecting sound waves (e.g., for detecting voices), a camera, a magnetic card reader (e.g., a credit card reader), a smart card reader, a bar code scanner, a radio frequency identification (RFID) tag reader, a port for receiving plugs, cables or other connectors, a battery, a power source, and any other appropriate hardware. Further, a POS terminal may include software for controlling the hardware, for operating programs, or for performing any other functions in accordance with various embodiments.

A POS terminal may be embodied primarily or entirely in software. For example, a POS terminal may manage transactions for a web site. The POS terminal may comprise software for processing transactional information related to purchases made on the web site.

Detection of One Device by Another

Various embodiments described herein may refer to the interaction between a first device and a "nearby" second device. In various embodiments, the first device may take action if the second device is nearby. In various embodiments, the second device may take action if the first device is nearby. When terms such as "nearby", "near", "close", "proximate", "presence", or the like are used, it will be understood that the first device may recognize the presence of the second device in various ways, that the second device may recognize the presence of the first device in various ways, that the first device may react to the presence of the second device in various ways, and that the second device may react to the first device in various ways. It may be noted that the first device may react to the presence of the second device without recognizing the presence of the second device if, for example, the first device is instructed to take an action by a third device which recognizes that the second device is near to the first device. In various embodiments, the first device and/or the second device may be in motion. For example, the first device may be moving (e.g., the first device may be carried by a walking person) while the second device may be stationary.

Various technologies may allow a first device to recognize and/or to react to the presence of a second device. Various technologies may allow a second device to recognize and/or to react to the presence of a first device. As used herein, the term "beacon" may refer to a device which generates a signal which may be used as a reference signal by another device or person, e.g., so that the other device may determine its own location or position. A beacon may emit a continuous, periodic, sporadic, or other type of signal. A beacon may emit a directed signal (e.g., a signal which is most easily detected by devices at a certain incident angle to the beacon) or the beacon may emit a signal of equal strength in all directions. A beacon may emit a signal when triggered by the presence of another device, or may emit a signal independently of other events. A beacon may have, as its sole function, the broadcast of a reference signal. A beacon may serve as a beacon only incidentally. For example, a light bulb may incidentally serve as a beacon even though its primary purpose may be to light a room. A beacon may be natural (e.g., the sun) or man-made. A beacon may emit light, sound, radio waves, microwaves, odors, or any other form of signals.

Radio Frequency Identification (RFID) tags or transponders are devices, generally small, that can transmit signals and/or redirect signals, and use such signals as a means for providing identification. The transmitted or redirected signals are generally radio waves. Signals which are transmitted or redirected may contain a unique signature or pattern, which may serve to uniquely identify the RFID tag. If the tag is associated with a device (e.g., by attachment or by incorporation into the device), then the unique identification of the tag can, by association, serve to uniquely identify the device.

Near field communication (NFC) is a technology that allows for secure wireless communication over short distances, typically in the range of inches. An exemplary application has been tested by Motorola and Mastercard, in which cellular phones are outfitted with NFC to allow for credit card payments using cellular phones.

Bluetooth is a specification for wireless networks which provides a means for devices to use radio waves to communicate over short distances.

WiFi is a technology, based on radio waves, for operating wireless local area networks. WiFi can allow a device to access the Internet via hotspots. WiFi can also allow two devices to communicate with one another directly in peer-to-peer mode.

Infrared data transmission can be used as a means of communication between two nearby devices. For example, an infrared light-emitting diode (LED) can be used to generate signals. The signal pattern can be created by switching the LED on and off. A receiver may include a silicon photodiode, which may convert incident infrared light into electrical signals. Infrared signals may also be transmitted with lasers.

A device may be recognized by means of a captured picture or image of the device. For example, a first device may take a picture of a second device. The first device may use image processing algorithms to detect salient features of the second device. For example, if the second device has a pattern of black and white stripes, then the first device may search for such a pattern within captured images.

One or more devices may use positioning technologies to determine their own location. Once the locations of two devices are known, simple algorithms may be used to determine whether the devices are close to one another or not. For example, the distances between two devices with known x and y coordinates can be at least approximated using the Pythagorean Theorem. Various positioning technologies may be used. For example, a device may receive a signal from a beacon or other signal generator of a known location. Particularly if the beacon has a short range, the device's position may be assumed to approximate the position of the beacon. In various embodiments, a device may receive signals from multiple beacons or signal generators. The signal generators may coordinate to transmit the signals simultaneously. However, depending on the device's location, the device will not necessarily receive the signals from all the beacons at the same time. For example, if the device is closer to beacon 1 than to beacon 2, the device will receive the signal from beacon 1 prior to receiving the signal from beacon 2. Based on the arrival times of signals from the various beacons, the device's location may be deduced. For example, geometric or trigonometric algorithms may be used to determine the location of the device based on the known locations of the beacons and based on the arrival times of simultaneously transmitted signals from the beacons. In an analogous fashion to systems involving beacons, positioning systems may make use of receivers at known locations (e.g., fixed receivers). The fixed receivers each receive a signal from the device about which a location is desired. The same signal from the device might arrive at the different receivers at different times, or from different angles. Based on the arrival times or angles of arrival of the signal at the various receivers, algorithms may be used to determine the location of the device. Exemplary positioning systems are as follows:

The Global Positioning System (GPS) is based on a constellation of satellites which transmit reference signals to locations on earth. GPS receivers can pick up reference signals from multiple satellites and use the signals to determine a position and/or an altitude.

Long Range Navigation (LORAN) is a navigation based on earth-based radio transmitters. The location of a device can be estimated based on differences in arrival times at the device of signals from three or more transmitters.

Radiolocation using the cellular telephone network is a system whereby cellular base stations serve as fixed receivers. The signal from a cellular phone may be received at multiple base stations. The location of the cellular phone may be determined based on when a signal from the cellular phone was received at each of the base stations, based on the angle with which a signal from the cell phone was received at each of the base stations, and/or based on characteristic distortions in the cell phone signal that would indicate a particular location of origin of the signal.

A first device may emit an audio signal. The audio signal may consist of a distinct series of notes or pulses. A second device may pick up the audio signal using a microphone, for example. The second device may recognize the distinctive pattern of the audio signal and may thereby deduce the presence of the first device. In a similar fashion, the second device may emit an audio signal which may allow the first device to identify the second device.

A first device may recognize the presence of a second device from physical or electronic contact. For example, a first device may have a port where a second device can be docked. When docked, the second device may come into electrical contact with the first device. The first device may thereby recognize the presence of the second device and/or the second device may thereby recognize the presence of the first device.

There are various ways in which one or more devices may detect the presence of one or more other devices. There are various ways in the proximity of two devices may be determined.

A first device may detect a signal from a second device. The first device may thereby detect the presence of the second device.

A first device may determine its own location. For example, the first device may use a positioning system to determine its own location. The first device may already know the location of the second device. For example, the second device may be at a well-known, fixed location. The first device may have stored in memory the location of the second device. Once the first device knows its own location and that of the second device, the first device may deduce (e.g., using geometric algorithms) when the first device is near to the second device.

A third device may detect the position of a first device, e.g., using a positioning system. The third device may know the position of a second device. The third device can then inform the first, second, or both devices of the positions of either or both of the first and second devices. The first device may thereby determine whether it is proximate to the second device. The second device may thereby determine whether it is proximate to the first device. In some embodiments, the third device may inform the first device that the first device is near the second device. In some embodiments, the third device may inform the second device that it is near the first device. In some embodiments, the third device may instruct the first device to take some action based on the fact that the first device is near to the second device, without necessarily informing the first device that the first device is near the second device. In some embodiments, the third device may instruct the second device to take some action based on the fact that the second device is near to the first device, without necessarily informing the second device that the second device is near the first device.

A third device may detect the positions of both a first device and a second device. The third device can then inform the first, second, or both devices as above. That is, the third device may inform the first and/or second devices of the first and/or second devices' positions or of the fact that the first and second devices are near to each other. The third device may also provide instructions to the first and/or to the second device based on the fact that the two devices are near to each other.

A third device may detect the position of a first device. A fourth device may detect the position of a second device. The third and fourth devices may then inform the first device of both positions. The third and fourth devices may inform the second device of both positions. The third and fourth devices may inform the first device that the first device is near the second device. The third and fourth devices may inform the second device that the first device is near the second device. The third and/or fourth devices may instruct the first device to take some action based on the fact that the first device is near the second device. The third and/or fourth devices may instruct the second device to take some action based on the fact that the first device is near the second device. The fourth device may inform the third device of the position of the second device. The third device may inform the first device of the positions of the first device and the second device. The third device may inform the first device that the first device is near the second device. The third device may inform the first device to take some action based on the fact that the first device is near the second device. The third device may inform the second device of the positions of the first device and the second device. The third device may inform the second device that the first device is near the second device. The third device may inform the second device to take some action based on the fact that the first device is near the second device.

A third device may detect the position of a first device. A fourth device may detect the position of a second device.

The third and fourth devices may inform a fifth device of both positions. The fifth device may inform the first and/or second devices of both positions. The fifth device may inform the first device that it is near to the second device. The fifth device may inform the second device that it is near to the first device. The fifth device may instruct the first device to take some action based on the fact that the first device is near the second device. The fifth device may instruct the second device to take some action based on the fact that the second device is near the first device.

As will be appreciated, a first device may be a mobile gaming device and a second device may be a POS terminal.

Detection of a Human by a Device

A mobile gaming device may detect the presence of another human being in various ways. The mobile gaming device may include a microphone. The microphone may pick up ambient audio signals. The mobile gaming device may analyze ambient audio signals for tell-tell human sounds, such as the sound of a voice, the sound of breathing, the sound of steps, and so on. For example, the mobile gaming device may use special software which is tuned to recognize voice signals. The mobile gaming device may recognize the presence of humans by other means. For example, the mobile gaming device may include a heat or infrared sensor. The mobile gaming device may use such a sensor to pick up the heat signatures of humans. In various embodiments, the mobile gaming device may include a camera. The camera may periodically snap pictures of its surroundings. The mobile gaming device may include image processing software for analyzing the pictures. The image processing software may have the capability to recognize images associated with humans. In various embodiments, the mobile gaming device may recognize the presence of humans via devices associated with the humans. For example, the mobile gaming device may recognize the signal from a nearby cell phone, e.g., by receiving the signal at an antenna associated with the mobile gaming device. Presumably, the cell phone is being carried by a human. Thus, by recognizing the presence of a cell phone, the mobile gaming device may be indirectly recognizing the presence of a human. In various embodiments, the mobile gaming device may recognize the presence of another mobile gaming device. Presumably, the other mobile gaming device is being held or carried by another human. Thus, by recognizing another mobile gaming device, the first mobile gaming device may indirectly recognize the presence of another human.

Networks

A casino may include one or more networks. A network may include two or more devices, such as computing devices, that are connected and/or in communication with one another. Devices may be connected or may communicate in a variety of ways, as will be appreciated. For example, devices may communicate using Ethernet protocols. Devices may communicate wirelessly, or via physical cables.

In various embodiments, a first type of network includes a retail network. A retail network may include two or more devices which manage the operations of a retailer. Devices in a retail network may track inventory, track transactions, record transactions, store money or other currency, process credit card transactions, put in requests for additional inventory, record which inventory is no longer present, determine promotions, transmit promotions to potential customers, track the purchasing habits of customers, track employees, issue commands to employees, track hours worked by employees, and perform any other function of significance to a retailer. A retail network may include products themselves. Products may contain RFID tags or other means by which the products can be tracked. The RFID tags may communicate with other devices in the network to allow the product's location to be tracked, or to allow other information about the product to be tracked (e.g., the product's temperature; e.g., how the product has been handled). A retail network may include one or more POS terminals. A retail network may include one or more servers. A retail network may include or more computers with specialized functions. A server, for example, may receive information about all the inventory in a retailer and may thereby keep track of all the inventory in a centralized location.

In various embodiments, a retail network may encompass a single store, a single merchant, a single restaurant, or a single location. In various embodiments, various retail networks may be in communication with one another. For example, at least one device in a first retail network may be in communication with at least one device in a second retail network. In various embodiments, a single retail network may encompass multiple retailers.

In various embodiments, a second type of network includes a casino network. The casino network may include one or more gaming devices, one or more devices for storing game software, one or more devices for managing accounting functions, one or more devices for tracking compliance with gaming regulations, one or more servers, one or more devices used for tracking the issuance and redemption of casino chips, one or more devices used for managing comp accounts, one or more display devices (e.g., public display monitors), and any other devices for managing the operations of a casino, entertaining players, or performing any other function at a casino. A casino network may include mobile gaming devices, in various embodiments.

In various embodiments, a casino network may communicate with a retail network. One or more devices in a casino network may be in communication with one or more devices in a retail network. A casino network may exchange information with a retail network. For example, a casino network may provide a retail network with information about a player's gaming history. A retail network may provide a casino network with information about a player's purchasing history. In various embodiments, a retail network may inform a casino network of an item that a player intends to purchase. The retail network may inform the casino network of the price of the item. The retail network may also inform the casino network of a first amount tendered by the player for the item. For example, if the price of the item is $19, the player may initially have tendered a $20 bill.

In various embodiments, a single device in a retail network may communicate directly with a single device in a casino network. For example, a POS terminal in a retail network may communicate via direct infrared link to a mobile gaming device in a casino network.

In various embodiments, a device in a retail network may communicate with a device in a casino network indirectly. A first device in a retail network may communicate with a second device in a retail network. The second device in the retail network may then communicate with a first device in a casino network. The first device in the casino network may then communicate with a second device in the casino network. In this indirect fashion, the first device in the retail network may communicate with the second device in the casino network. As will be appreciated more or fewer devices may enter into the chain of communication.

1. POS Terminal Accepts Value from a Mobile Gaming Device.

In various embodiments, a player may compensate a merchant for a product or service received from the merchant. The player may compensate the merchant for any other reason, in various embodiments. Accordingly, the player may provide to the merchant items of value. In various embodiments, a player may provide an item of value, e.g., as payment for a product. However, the merchant may actually receive a different item than that provided by the player. In the process, the item provided by the player may be converted into the item received by the merchant. In one example, the player pays with credits in a credit balance used for a game. The casino server deducts that number of credits from a credit balance of the player and adds an equivalent dollar value to an account of the merchant. Thus, the casino server has converted the player's credits into a dollar amount that is given to the merchant. As a result, the player has been given the opportunity to pay using a convenient item of value, while the merchant has received a different item of value (e.g., money) that is more convenient for the merchant. In various embodiments, a player may first provide an item of value to the merchant. The merchant may later convert the item into another item of value. For example, the merchant may receive comp points from a player. The merchant may then provide the comp points to the casino in exchange for money.

1.1. Types of Value Accepted.

1.1.1. From a Credit Balance.

In various embodiments, a player may provide credits from a credit balance. The credit balance may represent units of monetary value. For example, each credit may represent 25 cents. As another example, each credit may represent one dollar. The credits may be deducted from the player's credit balance. The credit balance may represent an amount of amount of money provided to the casino by the player, plus any amounts won through the play of games, less any amounts bet, less any amounts spent for other things, such as for retail purchases.

1.1.2. From a Separate Account.

In various embodiments, a player may maintain a separate account or balance besides a balance used for placing bets and receiving winnings. For example, a player may have a first account for use in gambling activities, and a second balance for use in purchases at retailers. Each account may have a separate balance. Further, there may be one or more restrictions placed upon the transfer of value between one account and the other. In various embodiments, value may be transferred from an account used for gaming to an account used for retail purchases, but not the other way around. In various embodiments, value may be transferred from an account used for retail purchases to an account used for gaming, but not the other way around. In various embodiments, when a player provides value to a merchant, the player may provide value from the account used for making retail purchases. A player's account for making retail purchases may be funded in various ways. The player may provide money to the casino in order to fund the account. The player may provide a credit card number or debit card number and authorize the deduction of funds in order to fund the player's account for retail purchases. The player may also receive value in the form of promotions. For example, a merchant may add $2 to the player's retail account in order to encourage the player to visit the merchant.

1.1.3. Comp Points.

In various embodiments, a player may use comp points to provide value to a merchant. Comp points may be used at some appropriate conversion rate. For example, a merchant may accept comp points at 100 points to the dollar. In various embodiments, a merchant may quote a price of an item in terms of comp points rather than requiring an explicit conversion. In various embodiments, the casino server may quote a number of comp points that the player will have to pay to the merchant for an item based on the retail price of the item. The casino server may ultimately receive comp points from the player (e.g., the casino server may deduct comp points from an account held by the player) and pay money to the merchant.

1.1.4. Merchant-Specific Points Earned.

For example, points earned playing a merchant-branded game. In various embodiments, a player may provide a merchant with merchant-specific points. The points may have previously been provided to the player for various reasons. The points may have previously been provided to the player: (a) as a promotion to the player from the merchant; (b) as compensation for the player viewing the merchant's ads, recommending a friend to the merchant, or performing some other service for the merchant; (c) as a thank you or token for a previous purchase made by that player at the merchant; (d) for playing a game which was associated with the merchant (e.g., for playing a game that included the merchant's colors, the merchant's promotions, favorable information about the merchant or other information about the merchant). The points may be useable only at a limited number of merchants or locations. In various embodiments, the points may be usable only at a single merchant. In various embodiments, the points may be usable with only a single company or with only a single brand. In various embodiments, merchant-specific points may include any tokens, units, scrip, or other item of value that is narrowly tailored to the merchant.

1.1.5. Coupons.

The mobile gaming device can store electronic coupons. In various embodiments, a player may provide coupons for a purchase. In various embodiments, the coupons are stored on the player's mobile gaming device. For example, a unique code which identifies a coupon may be stored on the player's mobile gaming device. The mobile gaming device may transmit the code to the POS terminal of the merchant in the process of the coupon being redeemed. The merchant may verify that the coupon is authentic and hasn't been used yet, for example, by looking up the code in a database of issued coupons.

1.1.6. Gift Certificates.

In various embodiments a player may use gift certificates to pay a merchant. Gift certificates may be stored on a player's mobile gaming device. For example, a gift certificate may be identified with a unique code. In the process of gift certificate redemption, the code may be transferred from the mobile gaming device to the POS terminal of the merchant. The merchant may verify that the gift certificate is authentic and hasn't been used yet, for example, by looking up the code in a database of issued gift certificates. Once the code has been received, the merchant may make a note in the database indicating that the gift certificate is no longer valid for future purchases.

1.1.7. Merchant Specific Accounts.

In various embodiments, a player may have a merchant specific account. Such an account may include a balance of money or other items of value usable only at a specific merchant. The player may have accumulated such a balance in various ways. In various embodiments, a player may receive value in his merchant specific account as a promotion from a merchant. In various embodiments, a player may receive value in his merchant specific account by winning a prize at a gaming device. The prize may be money or other value that is only redeemable at a specific merchant. For example, the game in which the prize is won may have the merchant's branding (e.g., the name of the game may be the same as the name of the merchant). For example, in a "Banana Republic" game, a player may be able to win value which is only redeemable for products at the Banana Republic store.

1.1.8. Mobile Gaming Device Allows Money to be Charged to a Player's Room.

In various embodiments, a mobile gaming device may allow purchases the player makes with a merchant to be charged to the player's hotel room.

1.2. Preference for One Form of Currency Over Another.

E.g., a player gets a bonus for using winnings. In various embodiments, a player may benefit from using one form of value over another, even if both forms of value may ultimately be exchangeable with the casino server for the same amount of money, or for the same amount of some other value. For example, a player may have two balances. A first balance may have $5 worth of credits usable at 5-cent games. The second balance may have $5 worth of credits usable at $1 games. The player may receive preferential benefit at the merchant for spending the $5 balance of credits usable at the 5-cent games. For example, the player may receive $6 worth of merchandise for his $5 credit balance usable at the 5-cent games, but only $5 worth of merchandise for his $5 credit balance usable at the $1 games.

1.2.1. Preference for where Currency was Won.

In various embodiments, certain types of value may be preferred based on where they were won. For example, a dollar value of credits won at a first game may be redeemable for more store merchandise than the same dollar value of credits won at a second game. The first game may be preferred by the merchant, for example, because the game may incorporate the merchant's logos or other information. In various embodiments, a POS terminal may receive from a mobile gaming device an indication of the manner in which credits were won. The POS terminal may receive such information as when the credits were won, where the credits were won, at what game the credits were won, in what location the credits were won, and so on. The merchant may then charge the player a variable number of credits based on the manner in which the credits were won.

1.2.2. Preference for Money Over Credits.

In various embodiments, a player may receive greater benefit (e.g., more merchandise) for using a balance of money versus a balance of credits, casino tokens, or other types of value.

1.2.3. Preference for the Manner in which Something was Won.

In various embodiments, a player may receive a benefit (e.g., more merchandise) based on the manner in which credits were won. A player may receive a relatively greater benefit for credits won in a bonus game. A player may receive a relatively greater benefit for credits won when using sub-optimal strategy in a game. A player may receive relatively greater benefit for credits won in a game with a higher denomination versus a game with a lower denomination. In various embodiments, a mobile gaming device, a casino server, a gaming device, or some other entity may maintain a record of the manner in which one or more credits were won. The record may include the strategy used in the game in which the credits were won, the point in the game during which the credits were won (e.g., during the bonus round), the number of lines played in the game in which the credits were won, the amount of money bet on the game in which the credits were won, and any other information relating to the circumstances under which the credits were won. The POS terminal may then charge the player an appropriate number of credits based on information about how the credits were won. In various embodiments, the merchant receives a constant amount of value from the casino server and the casino server deducts a variable number of credits from the player based the manner in which the credits were won. For example, for an $11 purchase, the casino may deduct from a player $10 worth of credits won at a $1 denomination machine, or $11 worth of credits won at a quarter denomination machine.

1.3. Accounting for the Transfer.

In various embodiments, the casino and the merchant may each make one or more accounting entries in order to track the transaction between the player and the merchant.

1.3.1. On the Merchant's End.

In various embodiments, the merchant may record as an asset the number of credits provided by the player. The merchant may also deduct from an inventory account the value of the product or service provided to the player. The merchant may note the name of the player from whom the credits were received, and the name of the casino with which the credits may be exchanged for cash.

1.3.2. On the Casino's End.

In various embodiments, the casino may record the name or other identifier of the merchant to whom the player provided credits.

1.4. How Value is Stored.

1.4.1. Digital Cash.

In various embodiments, the merchant itself stores the credits received from the mobile gaming device. The credits may be stored in electronic format. The credits may be stored as a set of data, such as a string of bits. The set of data may include another set of data that has been encrypted. For example, credits may be stored as a message which has been encrypted using private keys of one or more parties, and/or which has been time stamped at one or more times. For example, the message may have been encrypted using the private keys of the casino server and of the mobile gaming device. The credits stored by the merchant may comprise a bearer instrument and may be transferable to one or more other parties without the knowledge of the casino.

1.4.2. Casino Record.

In various embodiments, the merchant itself does not store the casino credits as a bearer instrument. Rather, the casino may record the fact that the merchant is now in possession of a certain number of credits. The casino may further record the fact that the player is no longer in possession of such credits. When the merchant later exchanges the credits for cash, the casino may record that the merchant is no longer in possession of such credits. Therefore, in various embodiments, the value of credits may be derived from the fact that the casino has a record of who possesses such credits. Transfers of credits between two parties may involve informing the casino so that the casino can update its records of who is in possession of credits.

1.5. Settlement Between the Merchant and the Casino (how the Casino Pays the Store Back for What is Owed).

In various embodiments, the merchant may wish to exchange credits received from one or more players for cash. Similarly the merchant may wish to exchange comp points or other casino scrip for cash. For example, the merchant may have received from players credits that are used in games of chance at the casino. However, the merchant may prefer cash for use in covering its expenses and in operating its business. Therefore, the merchant may wish to exchange credits received for cash or for some other liquid instrument (e.g., securities). The process of exchange may occur at various times and at various frequencies. The process of exchange between the merchant and the casino server may occur in various ways. In some embodiments, the merchant may initiate a request to perform an exchange. The merchant may indicate a number of credits that it wishes to provide to the casino. The casino may make a record of the number of credits to be received from the merchant. The casino may further transfer an equivalent amount of cash to a financial account of the merchant. If the credits are stored as a bearer instrument, then the casino may receive from the merchant any code or data sequence which is sufficient to put the credits in the possession of the casino.

1.5.1. Instant Settlement.

In various embodiments, the exchange of cash and credits may occur immediately after the merchant has received payment from a player in the form of credits.

1.5.2. Periodic Settlement.

In various embodiments, the merchant may amass a certain amount of credits received from one or more players over a period of time. The merchant may then engage in a bulk exchange of credits for cash with the casino.

1.5.3. Amount Casino Owes the Merchant is Credited Against the Merchant's Rent.

In various embodiments, credits or other casino scrip received by a merchant may be used to offset any amounts owed by the merchant to the casino. For example, credits received from a player may be used to offset rent that a merchant owes to the casino.

2. The Payment Protocol.

2.1. Player Signals Approval.

In various embodiments, a player may provide acknowledgement, approval, or some other signal in order to effect a payment of credits, or other value from his mobile gaming device to a merchant.

2.1.1. Player Signs on his Mobile Gaming Device.

In various embodiments, a player may sign his mobile gaming device. The player may sign in order to approve of the transfer of credits to the merchant and/or of the deduction of credits in order to make a purchase. In various embodiments, the player may provide another indicator of his approval of the transaction. In various embodiments, the player may provide a biometric input, such as a thumb print, in order to approve the transaction. The player may sign using a stylus, provide a thumb print using a thumb print reader in the mobile gaming device, or provide any other biometric using the appropriate interface to the mobile gaming device.

2.1.2. Player Enters Password to Pay.

In various embodiments, the player may enter a password in order to approve a charge. In various embodiments, the player may answer a secret question in order to approve a charge.

2.2. Messages Provided to the Player.

2.2.1. "we are Deducting $12 from Your Credit Balance for a Purchase at Joe's Pizza. Is this ok with you?" Before signing, the player may be prompted with a message. The message may ask the player whether he approves of the credit deduction. The message may further list the number of credits that will be deducted, the dollar value of credits that will be deducted, the name or names of the product being purchased, the name of the merchant, or any other information about the transaction.

2.3. The Mobile Gaming Device May Store a Receipt.

If a player is paying through the mobile gaming device, the mobile gaming device may display a receipt so a guard at the door knows you actually paid for something. In various embodiments, the mobile gaming device may store a receipt. The receipt may summarize the transaction. The receipt may indicate the amount of credits provided, the dollar value of such credits, the product purchased, the time purchased, and any other relevant information. The receipt may be stored in electronic form within the mobile gaming device. In various embodiments, the receipt may be stored in electronic form at the casino server. In various embodiments, the mobile gaming device may render a visual depiction of the receipt. In various embodiments, the player may be asked to show the receipt as he exits the premises of the merchant. A guard may wish to verify that the player has actually purchased products that the player walks out with. In various embodiments, the receipt may be accessible on the mobile gaming device at the request of the player. For example, the player may have the opportunity to select from a menu an item "view receipts". A list of receipts may thereupon come up on the display screen of the player's mobile gaming device. The player may then choose one of the receipts to view. The player may later call up the receipt when returning an item to the merchant so as to receive a refund.

3. Arrangements Between the Merchant and the Casino for Allowing Use of the Mobile Gaming Device.

3.1. Merchant Receives Special Hardware or Software from the Casino.

In various embodiments, the merchant may receive special hardware or software from the casino to allow the merchant to interact with a mobile gaming device. For example, special hardware or software may be used to communicate with a mobile gaming device, to receive casino credits as payments, to provide receipts, and so on. In various embodiments, a merchant may receive software from the casino. The merchant may receive the software on a storage medium, such as on a DVD. The merchant may receive the software as a download, such as from a website of the casino. The merchant may receive the software in various other fashions. The merchant may download the software to the merchant's POS terminal. In various embodiments, the software may be run from a merchant server. The merchant server may, in turn, communicate with the merchant's POS terminal. In various embodiments, the merchant may receive a plurality of software programs or modules. For example, a first software module may be used to operate the POS terminal, while a second software module may run on a merchant server. The first software module may include code for sending, receiving and interpreting signals from a mobile gaming device. The second module may include code for accounting for the receipt of casino credits. As will be appreciated, various software modules may have many other functions, in various embodiments. The merchant may also receive various hardware. The merchant may receive transceivers for communication with a mobile gaming device. Such transceivers may be attached or otherwise interfaced to the merchant POS terminal. In various embodiments, a merchant receives hardware and/or software from a third party. For example, the casino server may direct the merchant to place an order with a third party that writes software for interfacing with the casinos mobile gaming devices.

3.1.1. Merchant May Receive Special Casino POS.

In various embodiments, a merchant may receive a POS terminal from the casino. The POS terminal may be specially manufactured or configured to interact with one or more casino systems. For example, the POS terminal may be configured to interact with mobile gaming devices.

3.1.2. Payment.

In various embodiments, the merchant may pay the casino for software or hardware received from the casino. For example, a merchant may pay the casino $1000 for a POS terminal that interacts with mobile gaming devices of the casino. In various embodiments, the merchant may not pay the casino anything for hardware or software received from the casino. Rather, the casino may consider it beneficial that players will be able to conveniently use their mobile gaming devices to make purchases at merchant locations. In various embodiments, the merchant may pay the casino a licensing fee for hardware or software. For example, a merchant may pay the casino $50 per month for use of hardware or software that allows the merchant to receive payment from mobile gaming devices.

3.2. Credit Card Type Arrangement.

E.g., the merchant pays 2% per transaction. In various embodiments, a merchant pays the casino some percent of the revenue from every transaction. For example, the merchant may pay the casino 2% of the revenue received from each transaction. The 2% paid to the casino may compensate the casino for allowing the merchant to use casino credits as currency in its transactions. The percentage paid to the merchant may come before or after taxes.

3.3. Merchant Pays a Periodic Fee.

In various embodiments, the merchant pays the casino a periodic fee for the ability to transact in casino credits and/or for the ability to transact with mobile gaming device. The merchant may pay a fee, for example, on a daily, weekly, monthly, or annual basis. The fee may be a fixed fee, such as $100 per month. The fee may also be variable. The fee may depend on the number of transactions made in which a player used a mobile gaming device to pay. For example, the fee may be tiered such that there is a first fee for the first 100 transactions in a month, a second fee for the second 100 transactions in a month, and so on.

3.4. Merchant Pays a Fixed Amount Per Transaction.

In various embodiments, the merchant may pay a fixed fee per transaction in which player pays with a mobile gaming device. For example, the merchant may pay 25 cents per transaction to the casino for every transaction in which a player pays with a mobile gaming device. In various embodiments, a fee charged to a merchant may be a fixed quantity plus some percentage of the transaction price. For example, a merchant may owe 25 cents plus 2% of the price of the item purchased by the player.

3.5. Merchant Pays Depending on the Type of Credits Received from the Player.

In various embodiments, a merchant may pay a variable fee depending on the type of credits, currency, or other items used by the player. For example, the merchant may pay 3% of revenues for transactions in which the player used 5-cent credits, but only 2% of revenues for transactions in which the player used $1 credits. As another example, the merchant may pay a 3% fee if the player uses credits from a balance that can be used for gaming, but the merchant may only pay a 2% fee if the player uses credits from a balance that can be used exclusively for purchases.

4. Credit Card Tie-Ins.

In various embodiments, a mobile gaming device may function as a charge card, such as a credit card or debit card. A mobile gaming device may be capable of storing and transmitting a financial account identifier. The financial account identifier may be received by the merchant's POS terminal. The merchant may then authenticate the financial account identifier using a credit card network, such as the VISA, MasterCard, Discover, or Amex networks. To use a mobile gaming device as a charge card, the player may be required to sign up for a new charge card. For example, when the player first checks out the mobile gaming device, the player may fill out a an application containing his name, date of birth, social security number, and/or other pertinent information. A credit check may then be performed on the player before a new card may be issued to the player. A physical card may not necessarily be issued to the player. Rather, the player's mobile gaming device may function as a credit card or other charge card. In various embodiments, the player need not sign up for a new charge card. Rather, an existing credit card or other charge card of the player may be tied to the mobile gaming device. The mobile gaming device may be loaded with the player's credit card number, for example. Then, the player may use the mobile gaming device to more efficiently communicate his credit card number to a POS terminal. In various embodiments, when a player's existing charge card is tied to the mobile gaming device, the charge card may be immediately verified. Then, when a POS terminal receives a charge card identifier from a mobile gaming device, the POS terminal may be assured that the charge card is already valid and useable. Accordingly, the POS terminal need not, in various embodiments, go through an additional process of authenticating the charge card. In various embodiments, when a mobile gaming device submits financial account information about a player to a POS terminal, the mobile gaming device may also submit other information about the player. The mobile gaming device may submit the player's name, age, state of residence, zip code, and any other pertinent information. In various embodiments, when a player pays using a charge card through his mobile gaming device, the player may be prompted to sign on his mobile gaming device in order to confirm the payment. The player may sign on his mobile gaming device and a digitized version of the player's signature (e.g., a bitmap depicting the player's signature) may be transmitted to the POS terminal.

4.1. Visa is a Partner, and Payments Happen Through the Visa System.

In general, a third party can mediate this whole transaction. In various embodiments, a credit card association may handle a portion of transactions between the player and the merchant. For example, when the player pays for an item at the merchant, a financial account identifier associated with the player or with the casino may be transmitted to a bank associated with the player or the casino. The bank may then transfer funds to a bank of the merchant. The player, or the casino, may later be billed by his/its bank. If a bank of the casino transfers funds to the merchant's bank, the casino may later bill the player. The casino may collect from the player, for example, by deducting credits from a player account.

4.2. If Tied to a Credit Card, there are Restrictions on Using the Mobile Gaming Device for Gaming.

In various embodiments, a mobile gaming device may be tied to a credit card, debit card, or other charge card. The mobile gaming device may itself function as a charge card. However, laws or regulations may prevent a credit card from being used for gaming purposes. Therefore, in various embodiments, though a mobile gaming device may function as a credit card, no charges may be made to a player financial account for gaming purposes. In various embodiments, a player may not purchase credits through a charge account, including the charge account tied to his mobile gaming device. In various embodiments, a player may only use the charge account tied to his mobile gaming device for retail purchases. In various embodiments, restrictions may be placed on when a player may use his mobile gaming device for gaming versus when he may use his mobile gaming device for charge card transactions. In various embodiments, if the mobile gaming device is used as charge card to make a purchase, the player is prevented from using the mobile gaming device for gambling for a predetermined period of time (e.g., for five minutes). In various embodiments, if the player uses his mobile gaming device for gambling, the player is prevented from using his mobile gaming device as a charge card for a predetermined period of time (e.g., five minutes; e.g., ten minutes). In this way, it may be made clear that the charge card functions of a mobile gaming device are not used in gaming.

5. Mobile Gaming Device Allows for Random Payments.

For example, when paying for an item, you can do double or nothing, and your mobile gaming device will generate the random outcome. In various embodiments, a mobile gaming device may allow a transaction to be turned into a gaming event.

5.1. Double or Nothing.

In various embodiments, a player may initiate a transaction. The transaction may involve a product or service with a given price. The player may elect to bet some amount of money in order to reduce or to eliminate the cost of the product or service. In various embodiments, the player may elect to go "double or nothing." In this event, the player may risk an amount of money or a number of credits equal to the purchase price of the item. The amount may be risked on a game of chance, such as on a game of craps or blackjack. If the player wins the game, the player may receive the item for free. If the player loses the game, the player may lose the amount he risked. The player may still be required to pay the purchase price of the product or service using additional monies or credits. In various embodiments, a transaction may be turned into a gaming event through the auspices of the mobile gaming device. The mobile gaming device may prompt the player as to whether he would like to risk additional money to reduce the cost of the transaction. For example, the mobile gaming device may ask the player, "Would you like to pay an extra dollar to spin a slot machine? If you get at least one cherry, the purchase is free." Whatever the prompt, the player may have the ability to accept or reject. If the player accepts, the game may proceed. If the player wins, the casino may credit the purchase price of the item to the player's mobile gaming device. The purchase price of the item may then be transferred from the player's mobile gaming device to the POS terminal. In various embodiments, the casino may directly transfer cash or other value to the merchant upon the player winning the game. The merchant may then provide the product or service to the player without further payment required from the player.

5.2. POS Terminal Conducts the Game.

In various embodiments, the POS terminal may conduct a game that allows a player to reduce or eliminate the purchase price of an item. In various embodiments, the processor of the POS terminal may generate a random number. The random number may then be translated into a game outcome, which may in turn determine whether the player has won or lost. The POS terminal may further display graphics which show the game unfolding and which show the outcome of the game. The POS terminal may conduct a game once the player has accepted a prompt to play the game. The POS terminal may receive a signal from the player's mobile gaming device that the player wishes to play the game. The POS terminal may receive instructions from an employee of the merchant to initiate the game rather than receiving instructions from the player's mobile gaming device. In various embodiments, the POS terminal may receive from the player a bet amount prior to the initiation of the game. For example, the POS terminal may receive from the mobile gaming device a signal that the merchant may deduct a bet amount from the player. The merchant may also receive a signal from the casino server that the casino server has transferred money or credits from a player account to a merchant account. In any event, in various embodiments, the merchant may receive a bet from the player before the game has been initiated. If the game turns out against the player, the bet may be kept by the merchant.

In various embodiments, a bet by the player to win the purchase price of a product (e.g., to effectively win the product) may go through the casino. In other words, the counter party to the bet may be the casino. If the player loses his bet, the casino may keep the player's money. Thus, the merchant may be largely indifferent to whether the player wins or loses. If the player wins, the merchant may provide the product to the player without receiving payment from the player. However, the casino may provide the purchase price to the merchant.

5.3. Player Defines Parameters of the Game.

In various embodiments, a player may define one or more parameters of a game to be played. The game may be a game that the player plays in order to win a product. In various embodiments, the player may define his wager amount. The casino may then define the player's probability of winning such that the player's expected winnings are close to his wager amount. For example, the player's expected winnings may come out to be 95% of the player's wager in order to create a house edge for the casino. For example, the player may wish to bet $10 for the chance of winning a $100 item. Accordingly, the casino may set the player's probability of winning at 0.09. The monetary value of the player's expected winnings may thus be 0.09.times.$100 or $9. Thus, the casino will make an average of $1 from the bet. In various embodiments, the probability may be set to give the player expected winnings equal to his bet. In various embodiments, the probability may be set to give the player expected winnings in excess of his bet. This may be acceptable to the casino since the actual cost of the item may be less than its retail price. Therefore, the casino and the merchant stand to profit from the bet since the true value of the item to the casino or to the merchant is less than $100.

In various embodiments, a player may specify his probability of winning in a game. The casino or merchant may then specify the required wager amount for the player. For example, a player may specify that he wishes to play a game in which he has a 10% chance of winning a $100 item. The casino may then require the player to place a wager of $11 in order to play such a game. In various embodiments, the merchant may be a counter party to a player bet. In various embodiments, the casino may be the counterparty to a player bet.

5.4. Change Game.

In various embodiments, a player may make a purchase from a merchant or otherwise transact with the merchant. The player may owe a first amount and may initially give the merchant a second amount, where the second amount is greater than the first amount. The first amount may be a price of an item, such as a product or service. In various embodiments, the price may include any applicable taxes. In various embodiments, the price may exclude one or more applicable taxes. For example, the first amount may be $8.61, and the player may provide the merchant with a second amount of $10.00. The player may provide the merchant with $10.00 because $10.00 is a standard unit of currency. E.g., the player may have a ten-dollar bill, but not the exact change to pay $8.61. In various embodiments, the player may provide the second amount in other currency or other value. For example, in various embodiments, the player may pay for an item using casino credits or casino chips. In various embodiments, the player may pay for an item using comp points. In various embodiments, the second amount provided by the player may be greater than the first amount even when the player is using value other than paper money. For example, the player may pay for an item costing $8.61 using dollar denomination casino credits. Accordingly, the second amount provided by the player may be equal to $9.00.

In various embodiments, once the player has provided the merchant with the second amount, the player may be due some change from the merchant. For example, if the player owes the merchant $8.61 but provides the merchant with a ten-dollar bill, then the merchant may owe the player change of $1.39. At this point, the player may have the option of receiving his change from the merchant. In various embodiments, the player may refrain from taking his change and instead use the change as a bet in order to play a game. In various embodiments, the game may be any game, such as a video poker game, a slot machine game, a blackjack game, a craps game, a roulette game, or any other game.

In various embodiments, the game may include a pay table with any structure. The pay table may detail various outcomes the player may achieve in the game, as well as various amounts that may be won by the player based on the outcome. The payouts described in the pay table may be further based on the amount bet by the player. For example, a particular payout may be set at ten times the player's bet (e.g., the amount of change due to the player) and may thereby vary according to the size of the player's bet.

In some embodiments, a payout of the game may be the item being purchased. Thus, if the player achieves a particular outcome in the game, the player may receive the item being purchased for free. The player may accordingly be returned the second amount which he had initially provided to the merchant (e.g., the ten-dollar bill), and may also receive the product or service, now at no charge. In some embodiments, the only winning payout for the game is the item. In some embodiments, there are multiple possible winning payouts. In some embodiments, a player may win the item being purchased or he may win a jackpot whose value is much larger than the value of the item.

In various embodiments, if the player does not achieve a winning outcome in the game, then the player does not receive any change. For example, if the player had tendered $10.00 for an item costing $8.61, the player would not receive his change of $1.39. The player would still be entitled to the item, in various embodiments.

In various embodiments, once the amount of change due a player has been determined, a winning outcome for the game may be determined. In various embodiments, multiple winning outcomes for the game may be determined. For example, in a game of video poker, it may be determined that all hands which are 10-high straights or better are winning outcomes for the player. In a game of roulette, it may be determined that all numbers less than 7 are winning outcomes for the player. In various embodiments, the winning outcomes may be determined in such a way as to result in a desired house advantage. For example, winning outcomes may be determined for the game in such a way as to result in a house advantage of 5%. In various embodiments, winning outcomes may be determined in such a way as to result in approximately a desired house advantage.

In one example, suppose a player tenders a $10 bill when he owes $8.61 for an item. The player is thus owed $1.39 in change. The player elects to play a game of roulette in order to win the item. The casino and/or the merchant desire a house edge of 5%. The roulette game is structured so that the player wins the item if any of the numbers one through five occur in a single spin of the reel. Thus, for example, if the spin of the roulette wheel gives the number four, then the player wins the item and receives his $10 back. Otherwise (e.g., on number 33), the player keeps the item but does not receive any change. The house edge for the game may then be calculated as: ($1.39*33/38+−$8.61*5/38)/$1.39=5.3%.

In some embodiments, the casino server may solve for the probability of the player winning in order to achieve a desired house edge. The casino server may then determine the probability of one or more statistically independent possible outcomes. The casino server may then choose a set of such outcomes to be winning outcomes in such a way that the probabilities of the outcomes add up to the probability previously solved for. As will be appreciated, the casino server could similarly solve for the probability of the player losing in order to achieve a desired house edge. The casino server may then choose a set of outcomes to be losing outcomes such that the probabilities of all the outcomes in the set add up to the probability previously solved for. As will be appreciated, the casino server may first solve for a probability of the player winning in order to achieve a desired house edge, but then choose which outcomes will be losing for the player. Similarly, the casino server may first solve for a probability of the player losing in order to achieve a desired house edge, but then choose which outcomes will be winning for the player.

In various embodiments, when a player is betting his change on a game to win a product or service from a merchant, the game may be played on the mobile gaming device of the player. The mobile gaming device may display the results of the game. The player may show the results of the game to the merchant. The merchant may then return the full amount of money tendered by the player if the player has won, or keep the full amount of money tendered by the player if the player has lost. In either case, the player may keep the product or service. In various embodiments, the results of the game may be transmitted by the mobile gaming device to the POS terminal. Based on the results of the game, the POS terminal may then authorize the player to be provided with the full amount of money tendered, or for the full amount of the money to be kept. The POS terminal may further perform accounting functions. In various embodiments, the game may be played on the POS terminal. The POS terminal may display the results of the game. The POS terminal may also transmit the results of the game to the player's mobile gaming device.

In various embodiments, the POS terminal may perform various accounting functions. The POS terminal may record the price of the item acquired by the player. The POS terminal may record the amount tendered by the player. The POS may calculate and/or record the amount of change due to the player. The POS terminal may record information about the game played by the player. The POS terminal may record the type of game (e.g., roulette; e.g., craps), the winning outcomes in the game, the prizes and/or payouts in the game (e.g., the item), the outcome achieved in the game, whether or not the player won, the prize or payout that the player won, whether or not the player received his money back, and/or any other item of information. In various embodiments, the POS terminal may not itself record information, but may instead relay information to another device, such as to a merchant server or to the casino server.

In various embodiments, the merchant may take risk in the game. Accordingly, for example, if the player wins the game, then the merchant may lose the item without compensation. Similarly, for example, if the player loses the game, then the merchant may win the player's change. In various embodiments, the merchant does not take risk in the game. In such embodiments, if the player wins, the merchant may be paid the price of the item by the casino. If the player loses, then the merchant may owe the casino the change collected from the player.

In various embodiments, a player may play a series of games in order to determine whether or not he wins an item or not. For example, the player may play a game such as blackjack where payouts are not generally large multiples of the amount bet. Therefore, the player may be required to win several times at a game such as blackjack in order to parlay his change due into the full price of the item being purchased. In various embodiments, the player's change may be considered as an initial balance. A target balance may be set as the price of the item being purchased. The player may play as many games as required in order to achieve the target balance. If the player's balance reaches zero, however, the player may lose his change and still have to pay for the item.

6. How are Returns Handled?

In various embodiments, a player may wish to return an item he has received from a retailer. For example, the item may be an item of clothing that doesn't fit. The item being returned may be an item purchased using a mobile gaming device. For example, the item may be an item which the player has paid for using gaming credits. As another example, the item may be an item that the player has won through the play of a game. The merchant may ask for one or more pieces of information in order for a return to take place. In various embodiments, a merchant may ask for one or more of: (a) the item; (b) the item in a pristine or unused state; (c) the item in an unopened package; (d) the receipt for the purchase; (e) player information, such as the player's name and address; (f) the mobile gaming device (e.g., the player must present the mobile gaming device through which the player had acquired the item); (g) an identifier of the mobile gaming device (e.g., the player may present a serial number or other identifier of the mobile gaming device through which the purchase was made); (h) an proof of identification (e.g., a driver's license or passport); (i) a credit card, debit card, charge card, or other financial account identifier; (j) an indication of any promotion that was in effect when the item was purchased; and any other piece of information. In various embodiments, a player may present a receipt using the display of his mobile gaming device. The mobile gaming device may store receipts from a purchase. The receipts may be stored in any suitable format, such as in an image format, in text format, in encoded format, and any other suitable format. The player may call up the receipt on the display of his mobile gaming device. The player may then show the receipt to an employee of the merchant. The player may allow the receipt to be scanned from the display screen of the mobile gaming device to the POS terminal. For example, the POS terminal may include a scanner for scanning the display screen of the mobile gaming device. The POS terminal may also include a camera for photographing the receipt. Once scanned or photographed, the POS terminal may use image processing algorithms to read information from the receipt. Such information may include the name or identifier of the item, the date of purchase, the purchaser, the manner in which the item was acquired, and any other pertinent information.

6.1. No Returns Allowed.

In various embodiments, the use of a mobile gaming device to acquire an item may complicate the return process. In various embodiments, returns may not be permitted if an item has been acquired using a mobile gaming device. In various embodiments, returns may not be permitted if an item has been purchased using gaming credits. However, returns may be permitted if the item has been won through a game. In various embodiments, returns may not be permitted if an item has been won in a game. However, a return may be permitted if the item has been purchased using gaming credits.

6.2. Exchange.

In various embodiments, the player may exchange the item for another item. In various embodiments, exchanges are the only form of return permitted, and the player is not permitted to receive cash, casino currency or other items of liquid value for the item. In various embodiments, the new item the player receives may be of equal or lesser value to the item being returned. In various embodiments, the player may exchange his old item for a new item of lesser value. The player may receive some money or other currency in the process of the exchange. For example, the player may receive casino credits equal in value to the difference in price between the old item and the new item. In various embodiments, any value a player receives may be added to a balance associated with the player. The balance may be a balance of gaming credits, a balance of money useable at casino merchants, or any other balance. The value may be downloaded to the player's mobile gaming device. In indicator of the additions to a player balance may be displayed on the player's mobile gaming device. For example, a number describing the number of gaming credits held by the player may be incremented on the player's mobile gaming device.

6.3. Payment Given Back to the Player in the Form the Player Made it.

For example, if the player paid with credits, he gets back credits. In various embodiments, when a player returns an item, the player may receive his payment back in the form in which he had originally made the payment. If the player had paid for the item using gaming credits, the player may receive gaming credits back when he returns the item. If the player had paid for the item using a balance separate from a balance used for gaming, then the player may receive his payment back into the balance which is separate from the balance used for gaming. In various embodiments, a player may have played a game to win an item. The game may have required a bet on the part of the player. If the player returns the item, then the player may receive back only the amount that he bet in the game, and not the full price or value of the item. In various embodiments, the player may receive an amount that is greater than the bet amount, but less than the price or value of the item being returned. For example, a player may have bet $10 to win an item priced or valued at $100. If the player later returns the item, the player may receive $50.

6.4. Payment is Always Given Back in the Form the Casino would Most Prefer.

For example, payment is always given back in the form of gaming credits. In various embodiments, the merchant may pay the player for a return in the currency of its choice. The merchant may be able to pay back, for example, cash, casino credits, merchant credits (e.g., value redeemable for the merchant's products), or any other type of currency or value.

The merchant may also act on behalf of the casino, or as the casino. Thus, the merchant may return to the player a currency of the casino's choice. In various embodiments, the casino may choose to return gaming credits since the casino may wish the player to have the ability to easily participate in the casino's games. In various embodiments, when a player returns an item to a merchant, the casino may provide the player with currency or other value. For example, the casino may update a balance of the player's to reflect added value. The merchant may then be responsible for reimbursing the casino (e.g., if the merchant is a separate entity from the casino).

7. Method of Communication Between the Mobile Gaming Device and the POS.

7.1. Wireless 7.2. Close Proximity (Like RFID)

7.3. Direct Contact (e.g., in a Cradle)

7.4. The POS and the Mobile Gaming Device Talk Via the Casino Server

8. The Mobile Gaming Device can Save a Person from Having to Stand in Line.

They just pay through the mobile gaming device and then get the green light to leave. In various embodiments, a player may use a mobile gaming device to avoid a check out line or to avoid any other checkout process. The player may select a product. The player may enter a product identifier into the mobile gaming device. For example, the player may key in a Universal Product Code (UPC), which identifiers the selected product, into the mobile gaming device using the keypad of the mobile gaming device. The mobile gaming device may then communicate with the POS terminal of the merchant to find out information about the product. The mobile gaming device may receive information which includes the name of the product, the price of the product, and an attribute of the product. The mobile gaming device may then ask the player whether he is sure he wishes to buy the product at the price specified by the POS terminal. For example, the mobile gaming device may display a message for the player such as, "Are you sure you would like to buy this blue sweater for $25? If you answer yes, $25 in credits will be deducted from your account." The player may confirm by pressing a key on the mobile gaming device, touching a particular area of a touch screen on the mobile gaming device, or by taking any other appropriate action. The player's affirmation may then be transmitted to the casino server and/or to the POS terminal. The mobile gaming device may then transfer the price of the item to the POS terminal. The transfer may occur via the casino server. In some embodiments, the casino server may simply deduct credits or other value from a balance of the player and add money to the balance of the casino server. Once the product has been paid for, an indication that payment has been complete may be transmitted to the mobile gaming device. For example, the casino server or the POS system may transmit a signal to the mobile gaming device indicating that payment has been made. In various embodiments, an electronic receipt may be transmitted to the mobile gaming device. The mobile gaming device may then display to the player an indication that payment has been made. The mobile gaming device may further display to the player an indication that the player may leave the premises of the merchant with the product in hand.

In various embodiments, a player may acquire a product in other ways while still avoiding a checkout process. In various embodiments, a player may play a game in order to win a product. For example, the player may enter the UPC of a product into his mobile gaming device. The mobile gaming device may then host a game for the product. The player may make a required bet (e.g., a bet of 10% of the price of the product) and may then play the game. If the player wins the game, then the player may be entitled to keep the product and to walk away from the premises of the merchant.

9. Non-Transactional Information Passed Between the POS and the Mobile Gaming Device.

Various information may be passed between the POS terminal and the mobile gaming device. Information may be passed through direct communication between the POS terminal and the mobile gaming device. E.g., the gaming device may transmit an infrared signal to the POS terminal.

9.1. Current Product Inventory.

The POS terminal may communicate to the mobile gaming device information about current product inventories. For example, the POS terminal may indicate that a certain type of jewelry is in stock, or that a certain menu item is being served. In various embodiments, a POS terminal may communicate information about a group of items. For example, a POS terminal may communicate an entire wine list being served by a restaurant. The POS terminal may communicate an entire set of vegetarian entrees, an entire set of desserts, or an entire menu, in various embodiments. A POS terminal may communicate information about a new line of clothing. For example, the POS terminal may indicate that a spring line of clothing is in stock, or that clothing from a new designer is in stock. As will be appreciated, there are many other groups of items about which information may be communicated to a mobile gaming device.

9.2. Current Promotions, Such as Sales.

In various embodiments, a POS terminal may communicate to a mobile gaming device information about various promotions. For example, the POS terminal may communicate that there is a 25% discount on all store items currently in effect. A POS terminal may communicate various product information to a mobile gaming device, such as in an effort to entice the player to purchase the product. For example, a POS terminal may communicate to a mobile gaming device that a ceramic art work is made by the finest craftsmen in the world.

9.3. Information about a Game.

In various embodiments, a mobile gaming device may communicate to a POS terminal information about a game played by the player. In various embodiments, the mobile gaming device may communicate any information about the gaming history of the player. The POS terminal may information about the player, about the player's gaming history, or about anything else, to determine a message to transmit to the player. For example, if the player has had bought in for a large amount of money, the POS terminal may send promotions to the mobile gaming device which relate to relatively more expensive items. In various embodiments, if the player has been consistently playing low denomination slots, the POS terminal may send a promotion to the player asking whether he would like to buy a postcard. The underlying assumption may be that the player is not wealthy and therefore may not be in the market for high value items. In various embodiments, if the player has been playing quickly, a POS terminal at a fast food restaurant may send a promotion to the player. The underlying assumption may be that the player is in a hurry and so would appreciate fast food. In various embodiments, the type of game played by a player may influence the type of promotion. For example, a player who has played graphics intensive game may be sent a promotion in the form of a sophisticated computer animation. A player who has played games with lots of sound effects may be sent a promotion with a catchy jingle. A player who has played a game with a theme of Asian cooking may be sent a promotion from an Asian restaurant.

9.4. Information about where the Player has been.

In various embodiments, a mobile gaming device may store information about where a player has been. The mobile gaming device may have position tracking capabilities, for example. In various embodiments, the casino server may track the position of the mobile gaming device over time. Information about where the player has been, including paths the player has taken (e.g., the progression of the player's position over time) may be transmitted to the POS terminal. Information about where a player has been and/or paths the player has taken may be used to determine promotions for the player. For example, if the player has not been near any restaurants in the last three hours, the POS terminal of a restaurant may transmit information, including graphics, of popular food items to the player. If the player has been in a store which features a particular type of merchandise, then the POS terminal of a different store may determine promotions for similar types of merchandise. For example, if a player has been in a sporting goods store, the POS terminal of another merchant may send to the player's mobile gaming device a message saying, "We have a great deal on golf clubs. Come in and take a look!"

9.5. Personalized Offers ("Hey Sue, we have a Purse we Think You would Like.")

In various embodiments, the POS terminal may transmit promotions, messages, offers, or any other information to a mobile gaming device. The POS terminal may transmit personalized messages for a player. The message may address the player by name. The messages may reference personal information of the player. Personal information may be supplied to the POS terminal by the mobile gaming device or by the casino server. In various embodiments, the POS terminal may not have some player information. Rather, the POS terminal may transmit a generic message to the mobile gaming device. The mobile gaming device may then fill in information about the player. For example, the POS terminal may send a message to the mobile gaming device of the player with directions to the mobile gaming device as to where to fill in various items of player information. The mobile gaming device may then receive the message, fill in player information in the appropriate places in the message and then display the message for the player.

10. Hardware on the Mobile Gaming Device.

The mobile gaming device may include various items of hardware. Such items may allow a player to more conveniently make purchases using the mobile gaming device, for example.

10.1. Bar Code Scanner.

A mobile gaming device may include a bar code scanner.

10.2. Camera.

A mobile gaming device may include a camera. The camera may be used to photograph a UPC. Software contained on the mobile gaming device may be used to determine the product based on the UPC. An image of the product may also be interpreted using image recognition software to allow the mobile gaming device to identify the product.

11. Purchases Over the Web Using Credits.

In various embodiments, credits or other items of value stored on a mobile gaming device may be used for purchases made over the Internet. In various embodiments, the mobile gaming device may interact with a web-based POS terminal. In various embodiments, during a checkout process, a player may be asked to supply payment. The player may House Edge, House Advantage As used herein, the terms "house edge" and "house advantage" may refer to an amount that the house is expected to retain, on average, per unit bet by the player. The house edge may be expressed in percentage terms. For example, a house edge of 5% may indicate that the house can expect to retain 5 cents on average per dollar bet by a player. It should be noted that a statement of a house edge does not imply that the house will necessarily retain the stated amount of a player's bet on each game. The house edge, rather, refers to an expectation or average. For example, suppose a player bets $1 on a game in which he has a 45% chance of winning $2, and a 55% chance of winning nothing. The house edge may be calculated as $(0.55*(\$1-\$0)+0.45*(\$1-\$2))/\$1=10\%$. Thus, the house may expect to win 10 cents per dollar wagered by the player.

Gaming History (of a Player)

The gaming history of a player may include outcomes, results, and other events that have occurred in a player's games in the past. The gaming history of a player may include information about the following:

The last outcome achieved

The last X outcomes achieved

Any games, events, results, or outcomes that have occurred in the last hour

Any games, events, results, or outcomes that have occurred in the X period of time Any games, events, results, or outcomes that have occurred in a player's trip, including any aggregate results of the player's trip (e.g., total winnings for the trip)

The player's gross winnings

The player's net winnings

Outcomes, net winnings, gross winnings, or any other statistic achieved over the player's lifetime An amount of a buy in (e.g., an amount of money initially brought to a table by a player)

An amount of a cash out (e.g., an amount of a money with which a player leaves a gaming device, gaming table or gaming session)

Jackpots won by the player

The largest payouts received

Current credit balance

Amounts wagered per game

Which games were played

Playing strategies

Number of pay-lines

Rate of play

Number of games played

Number of games played in last X period of time

Preferred gaming device

Gaming device that gave the player the most favorable results

Game opponents

Dealers played against

Comps awarded

Encryption

As used herein, the term "encryption" may refer to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

It will be appreciated that other methods besides encryption may be used to hide or obscure information, such as encoding or steganography. Such methods may also be used in conjunction with cryptography.

Encryption may be used to:

Send a message only specific recipients can read. For example, Alice and Bob may both be in possession of the same secret key. Alice may encrypt a plaintext message with the secret key. She may transmit the resultant ciphertext to Bob. Bob may then decrypt the cyphertext using the secret key so as to view the plaintext version of the message.

Allow messages to be encrypted by many and decrypted only one (e.g., PGP). For example, Alice may possess a public and a private key. Bob may wish to send Alice a message that only Alice will be able to read. Bob may create a message in plaintext and encrypt it using Alice's public key. Bob may send the resultant ciphertext to Alice. Alice may then decrypt the ciphertext using her private key, and may thereby view the plaintext message. Should Cindy intercept the ciphertext message on its way from Bob to Alice, Cindy would not be able to decrypt the message since Cindy would not have access to Alice's private key. Alice's public key, although available to Cindy, would not be sufficient to decrypt the ciphertext message in a practicable amount of time.

Authenticate the sender of a message. This use of encryption may include having the sender create a digital signature. For example, Alice would like to send a message to Bob in such a way that Bob can be confident that the message has come from her. Alice may construct a plaintext message and encrypt the plaintext into ciphertext using her private key. Alice may then send the ciphertext message to Bob. Bob may then use Alice's public key to decrypt the ciphertext back in to plaintext. Since Alice's public key only works to decrypt a ciphertext message created using Alice's private key, and since presumably only Alice has access to her own private key, Bob can be confident that the message originated from Alice.

Allow for non-repudiation. If a sender has applied a digital signature to a message, or portion of a message, then the sender will not later be able to claim he did not send the message.

Guarantee a time/data sent. See hashing below.

Guarantee receipt by recipient. See hashing below.

Verify that a message has not been altered after being sent by the sender. See hashing below.

Hashing is a process whereby input data, typically of arbitrary length, is transformed into output data, typically of shorter length and/or of fixed length. A hash function is a function that performs the transformation. Often, useful hash functions will be one-way functions. That is, for a given input, the output can be computed readily. However, for a given output, the input which produced the output will be difficult to calculate. Also, useful hash functions will often have the property that two differing inputs rarely produce the same output. Hashing can be used for the following purposes:

To perform data redundancy checks. For example, a database may contain a large number of names. The names may be of arbitrary length. To check for redundant names, hash values for the names may be created. The hash values may be of smaller size than the names and may all be of the same length. Thus, it may be easier to compare the hash values of the names that it will be to compare the names themselves.

To verify that a message has not been altered. For example, Alice can send a plaintext message to Bob along with a hash value of the message. Alice can apply a digital signature to the hash value so as to assure Bob that the hash value has been sent by Alice. When Bob receives the plaintext message from Alice, Bob can compute the hash value of the message. If the hash value that Bob computes is the same as the hash value that Alice has sent to Bob, then Bob can be fairly confident that the message has not been altered en route from Alice to Bob.

To prove possession of a message without having to reveal the message. For example, Alice can send a message to Bob. Bob can take the hash of the message and send it back to Alice. Alice may thus be assured that Bob has the message without the risk of the message being intercepted en route from Bob to Alice.

To prove possession of a message at a certain time without having to reveal the message. For example, Alice might have a great idea and wish to prove she came up with it at a certain time without having to reveal the idea. Thus, Alice might write out the idea in the form of text, and take a hash value of the text. Alice can then publish the hash of the text in a newspaper. It will then be readily apparent that Alice had possession of the idea at least on the date of the newspaper's publication.

To timestamp a document. For example, a document may be sent to a time-stamping service. The service may then determine the hash value of the document. The service may append the then current date and time to the hash value of the document and apply a digital signature to the result. The digitally signed hash value plus date and time may then be published.

So long as the time-stamping service can be trusted to provide accurate dates and times (e.g., not to use old dates and times) then the published timestamp may serve as proof that the document was in existence as of the date and time provided by the time-stamping service. Further precautions may ensure that it becomes very difficult for even the time-stamping service to provide fake times and dates. For example, the time-stamping service may add a sequence number, (e.g., 1, 2, 3, etc.) to each document it timestamps. If the service wishes to provide an old date, the service would have to find an older sequence number. The older sequence number would have to fit between two sequence numbers used immediately before and immediately after the desired fake date. However, no such sequence number would be available if, e.g., no numbers had been skipped in the first place.

In various embodiments, a distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In some embodiments, the gaming system communications network is entirely independent of the Internet. In some embodiments, the gaming system operation makes minimal use of the Internet, such that only information for which there are no security issues is transmitted via the Internet and/or such that information may be encrypted. In various embodiments, the communications network enables players to participate in gaming from remote locations (e.g., outside of the gaming area of a casino). Also, the system may enable players to be mobile during participation in the gaming activities. In various embodiments, the system has a location verification or determination feature, which is operable to permit or disallow gaming from the remote location depending upon whether or not the location meets one or more criteria. The criterion may be, for example, whether the location is within a pre-defined area in which gaming is permitted by law.

As shown in FIG. 1, for example, gaming system 10 may include at least one user 12. The system may include additional users such that there is at least a first user 12 and a second user 14. Multiple users may access a first gaming system 10, while other multiple users access a second gaming system (not shown) in communication with first gaming system 10. Users 12 and 14 may access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 may be flexible, however, and computer 18 may reside adjacent to or remote from the domain of gaming service provider 20. Various embodiments may not include a gaming service provider. The computer 18 and/or gaming service provider 20 may reside within, adjacent to, or remote from a gaming provider (not shown in FIG. 1). The gaming service provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

In various embodiments, software resides on both the gaming communication device 13 and the computer 18. Software resident on gaming communication device 13 may be operable to present information corresponding to gaming activities (including gambling and non-gambling activities discussed herein) to the user. The information may include, without limitation, graphical representations of objects associated with the activities, and presentation of options related to the activities and selectable by the user. The gaming communication device software may also be operable to receive data from the computer and data input by the user. Software resident on the computer may be able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are also contemplated. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In some embodiments, the communication of gaming information takes place without involvement of the Internet. However, in some embodiments, a portion of the gaming information may be transmitted over the Internet. Also, some or all of the gaming information may be transmitted partially over an Internet communications path. In some embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 2:
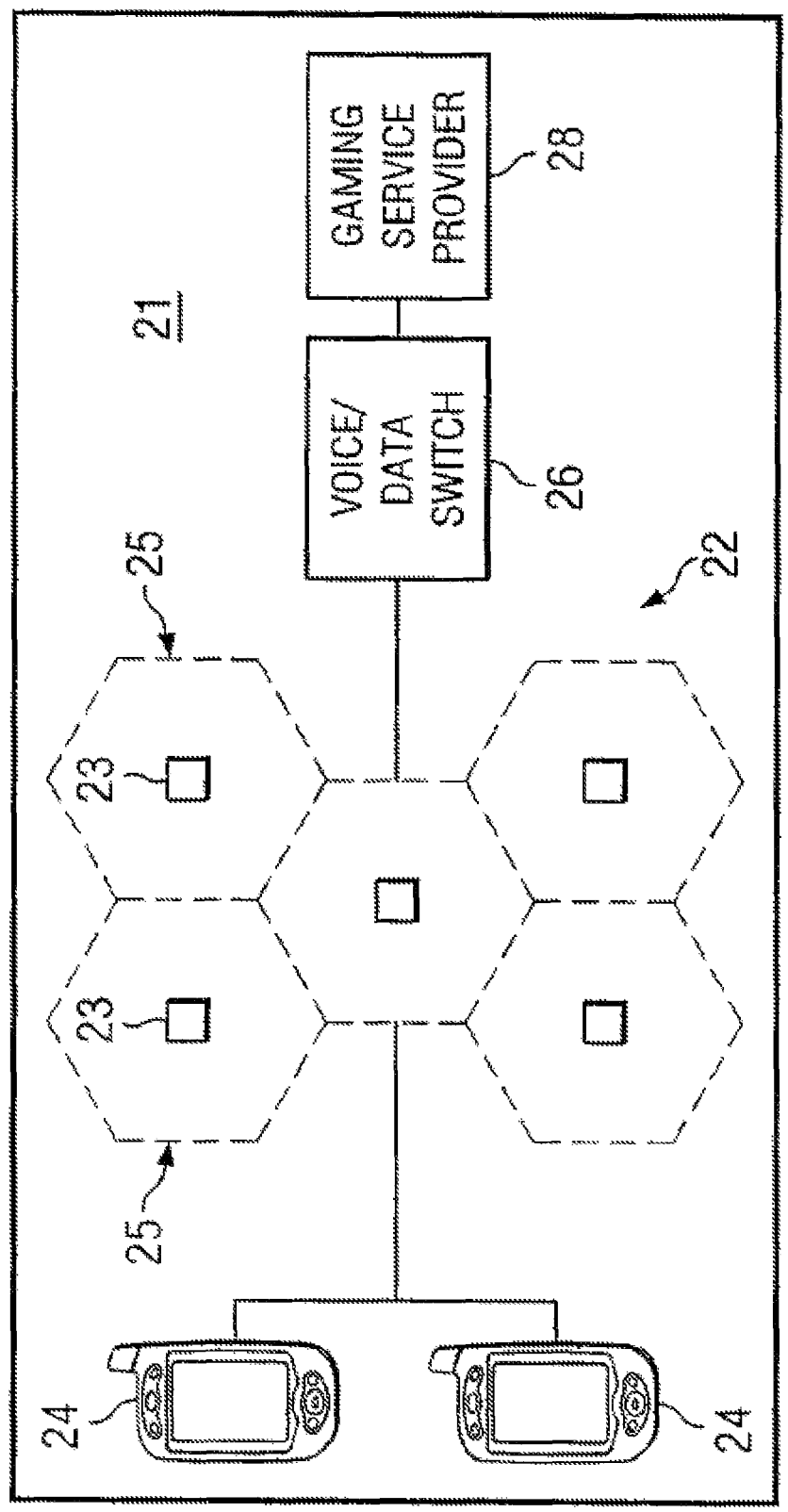
FIG. 2 shows a communications network according to some embodiments.

According to some embodiments, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch 26, which may be connected to the wireless portion of the network via a dedicated, secure landline. The communications network may also include a gaming service provider 28, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

In various embodiments, in the case of a cellular network for example, the gaming system is enabled through the use of a private label carrier network. Each base station is programmed by the cellular carrier to send and receive private secure voice and/or data transmissions to and from mobile station handsets. The handsets may be pre-programmed with both gaming software and the carrier's authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network may be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices may not be allowed to "connect" to the Internet. This ensures a high level of certainty that bets/wagers originate and terminate within the boundaries of the gaming jurisdiction and the "private" wireless system cannot be circumvented or bypassed. Although in some embodiments some data and/or voice traffic may be communicated at least partially over the Internet, the communication path may not include the Internet in other embodiments. Alternatively, in some embodiments, certain non-gaming information may be transported over a path which includes the Internet, while other information relating to the gaming activities of the system is transported on a path that does not include the Internet.

Figure 3:
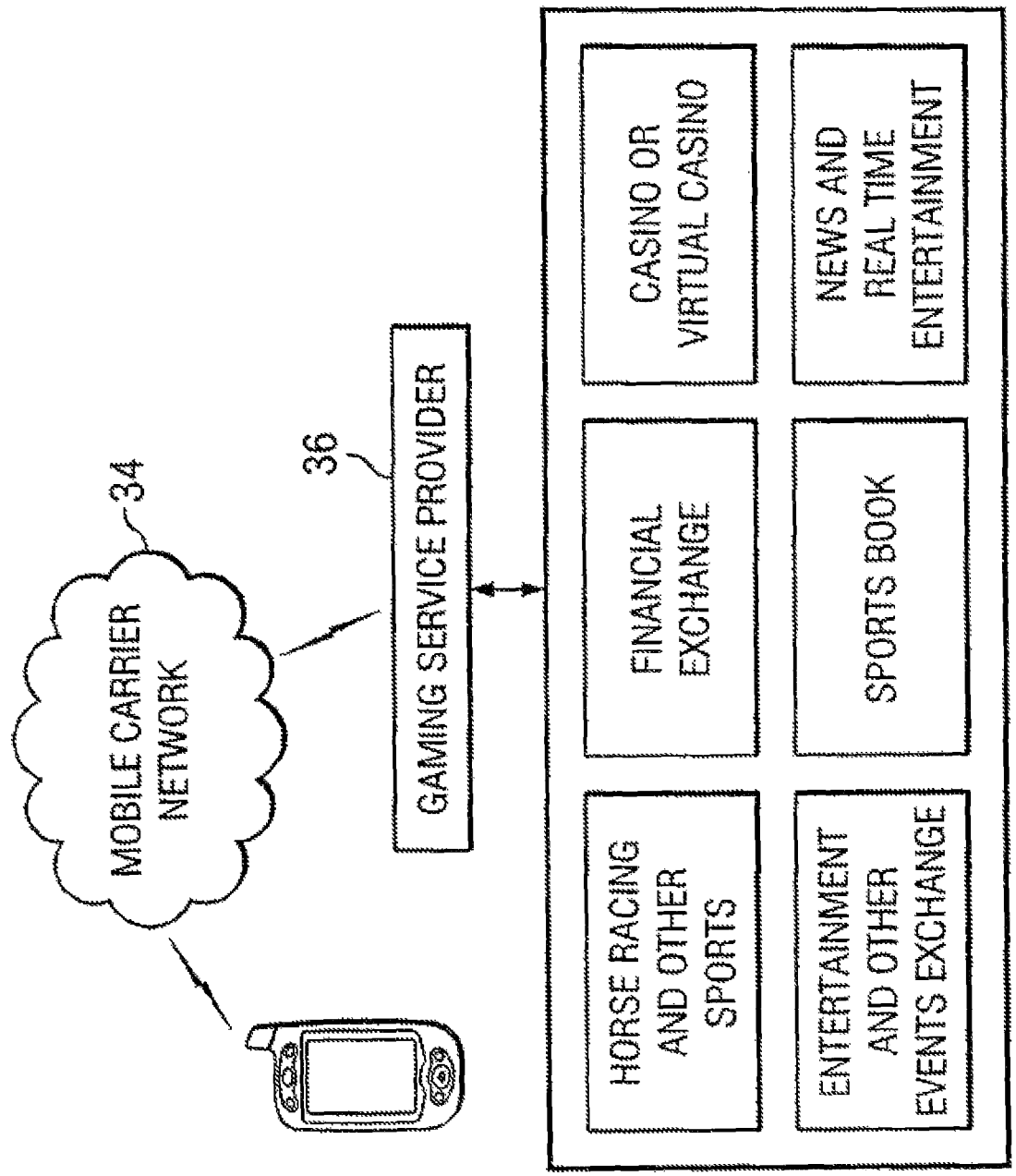
FIG. 3 shows a gaming service provider in communication with a gaming communication device according to some embodiments.

As shown in FIG. 3, a gaming communication device 32 is in communication with a gaming service provider 36 over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 4:
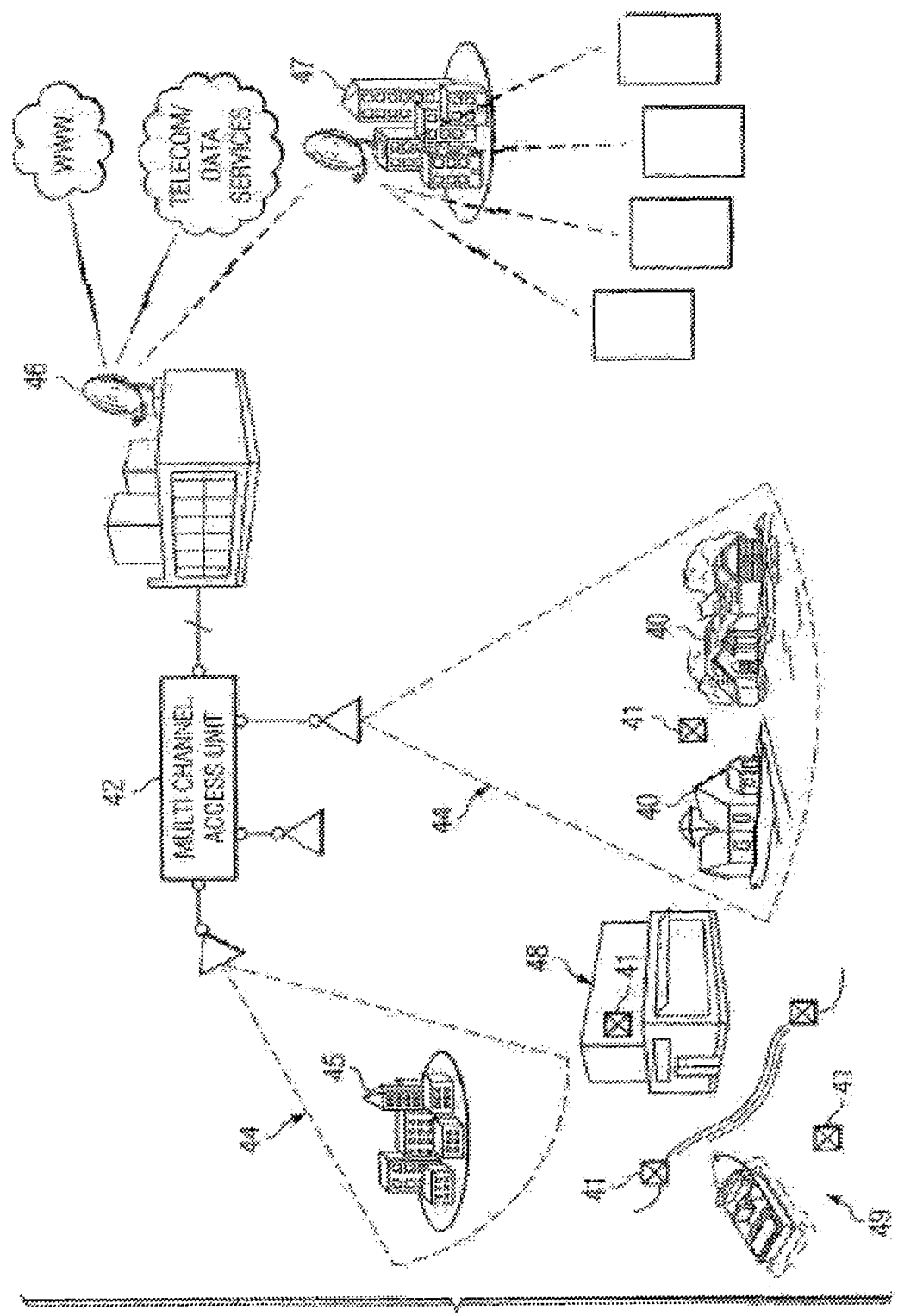
FIG. 4 shows a communications network according to some embodiments.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 44, a cellular network comprising a multi-channel access unit or sectorized base station 42, and a satellite network comprising one or more satellites 46.

With respect to the private wireless network, because the technology may cover small areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified to suit various embodiments.

In some embodiments, the system architecture for the gaming system includes:

a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and CDMA-technology that is secure for over-the-air data protection;

at least two layers of user authentication, (that provided by the mobile carrier and that provided by the gaming service provider);

compulsory tunneling (static routing) to gaming servers; end-to-end encryption at the application layer; and state-of-the-art firewall and DMZ technologies;

an MWAN (Metropolitan Wireless Access Network), which consists of licensed and license-exempt, point-to-point links, as well as licensed and license-exempt, point-to-multi-point technologies; (3) private MAN (Metropolitan Access Network) T1 and T3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices may be WiFi- or WiMax-enabled PDAs or mini-laptops, and do not have to be managed by a third-party partner.

In various embodiments, the gaming system includes a location verification feature, which is operable to permit or disable gaming from a remote location depending upon whether or not the location meets one or more criteria. A criterion may be, for example, whether the location is within a pre-defined area in which gaming is permitted by law. As another example, a criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
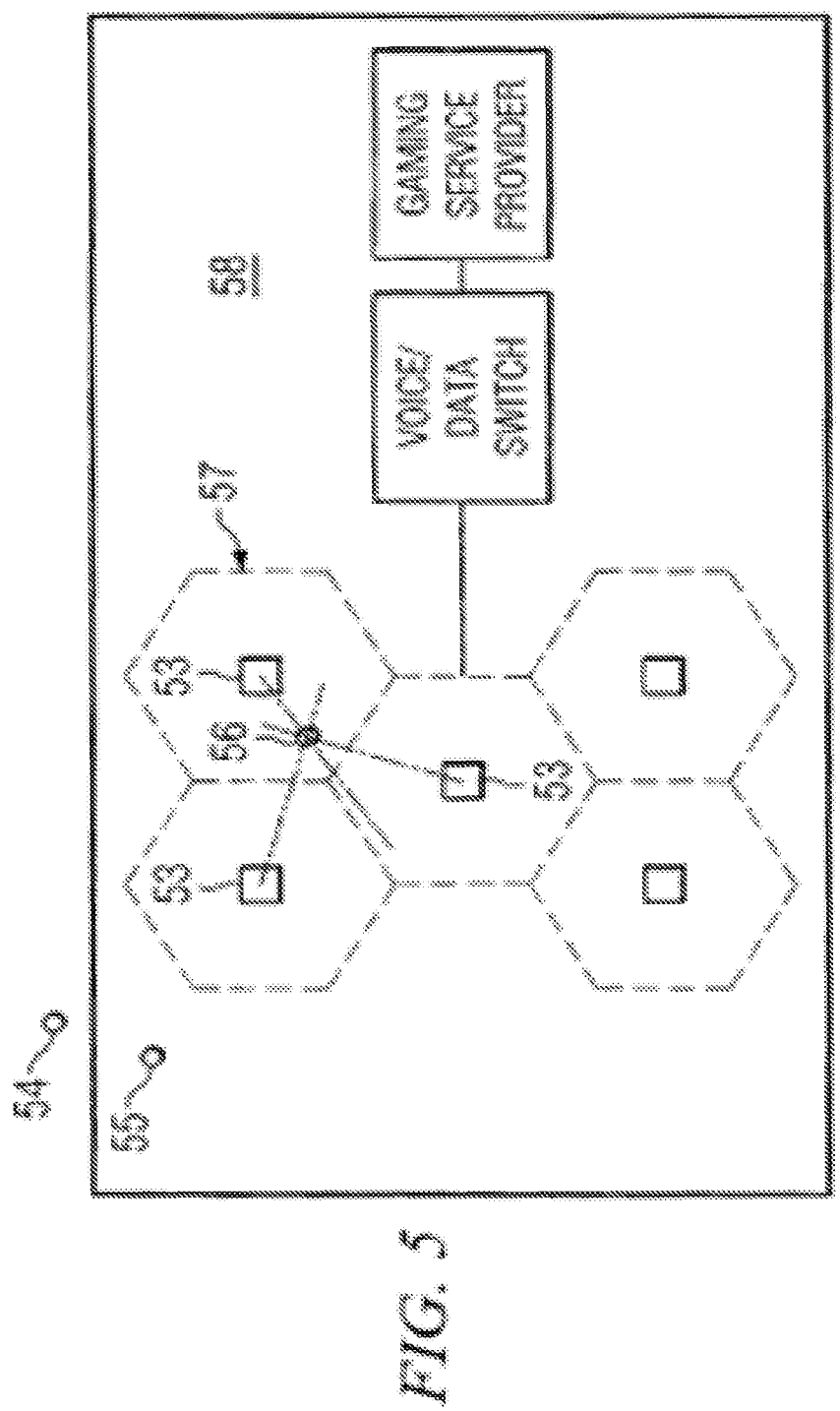
FIG. 5 shows a gaming system according to some embodiments.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing may not specify location. Rather, it may ensure that a mobile station is within certain boundaries. For instance, geo-fencing may be used to ensure that a mobile station beyond state lines does not access the gaming system. Triangulation on the other hand may specify a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In various embodiments, location verification is accomplished using channel address checking or location verification using some other identifying number or piece of information indicative of which network or portion of a network is being accessed by the gaming communication device. Assuming the usage of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a some embodiments, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. In various embodiments, the gaming service provider either maintains, or has access to, a database that maps the various possible worldwide mobile network identifying numbers to geographic areas. Various embodiments contemplate using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In various embodiments, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 6:
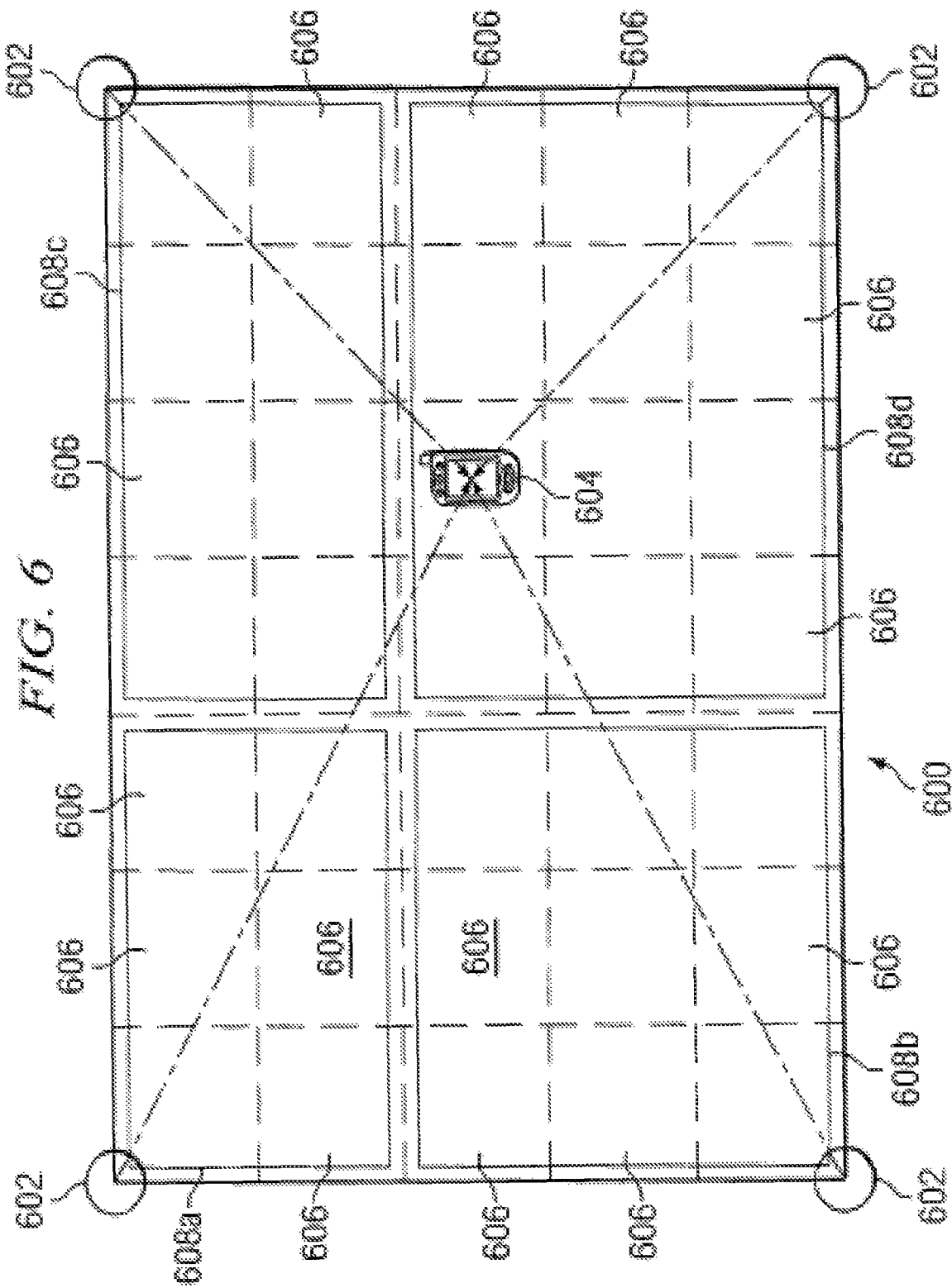
FIG. 6 shows a wireless gaming system according to some embodiments.
Figure 7:
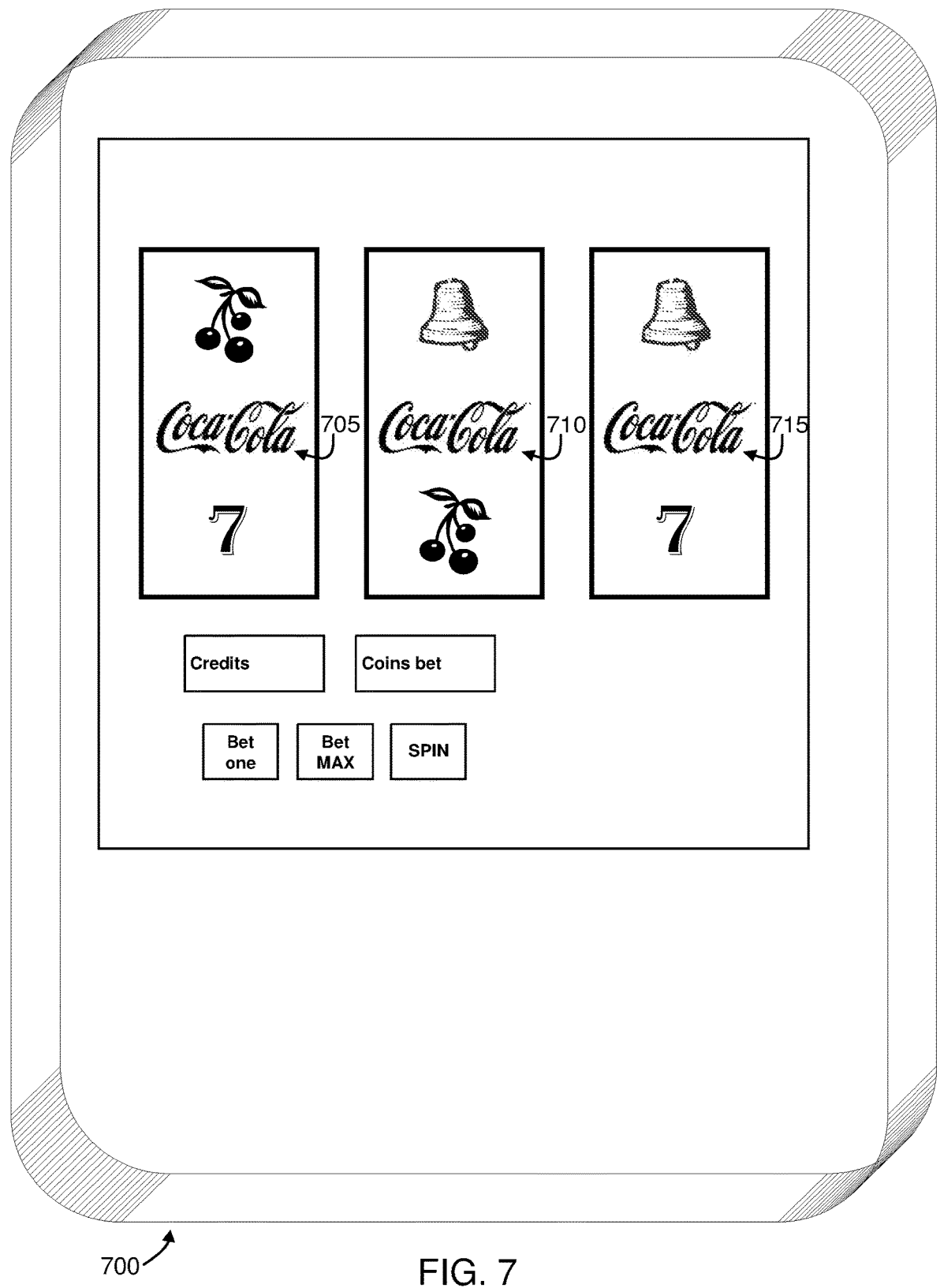
FIG. 7 shows a mobile gaming device with promotional content according to some embodiments.

In various embodiments, a gaming system may include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 6 illustrates an example of a wireless gaming system in which the location of a gaming communication device 604 may be determined in accordance various embodiments.

As shown in FIG. 6, a wireless gaming system comprises a wireless network that at least partially covers casino complex 600 in which one or more gaming communication devices 604 may be used to participate in a variety of gaming activities. The wireless network may comprise at least three signal detection devices 602, although various embodiments may include fewer or greater than three signal detection. As shown in FIG. 6, the wireless network comprises four signal detection devices 602, each located at one corner of casino complex 600. In various embodiments, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In various embodiments, signal detection devices 602 may also be used to transmit, as well as receive, signals to gaming communication device 604.

In various embodiments, casino complex 600 may be divided into one or more zones 608*a-d*, which represent different areas of the casino complex, such as the lobby, guest rooms, restaurants, shops, entertainment venues, and pool areas. For example, as shown in FIG. 6, zone 608*a* may correspond to the casino lobby, zone 608*b* may correspond to guest rooms, zone 608*c* may correspond to restaurants, and zone 608*d* may correspond to the gaming floor of the casino. Each zone 608 may be further divided into one or more sub-zones 606, each specifying a particular location within zone 608. Sub-zones 606 may be arranged in a grid formation, each sub-zone 606 having a uniform size. In some embodiments, each sub-zone may comprise 9 square feet (i.e., 3 feet by 3 feet). In some embodiments, each sub-zone may comprise 100 square feet (i.e., 10 feet by 10 feet). The choice of the size of an area covered by a sub-zone may depend on administrator preferences, technical limitations of the wireless network, and governmental regulations, as well as other considerations.

Particular embodiments may use this mapping of casino complex 600 into a plurality of zones 608 and sub-zones 606 to determine the location of gaming communication device 604 within the complex. These embodiments may utilize the signal received by signal detection devices 602 from gaming communication device 604 to determine the location of the device.

In various embodiments, the location of gaming communication device 604 may be determined based upon the strength of the signal received by each signal detection device 602 from device 604. In various embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In various embodiments, the location of gaming communication device 604 may be determined based upon an elapsed time between the transmission of the signal from device 604 and the receipt of the signal by each signal detection device 602. In various embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments.

In various embodiments, the various functionalities of the gaming communication device may be enabled or disabled based upon the zone 608 in which the device is located. In such embodiments, each zone 608 of the casino complex may be associated with a set of allowed activities. For example, the "lobby" zone 608*a* of the casino complex may have all activities allowed, while the "guest room" zone 608*b* of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Various embodiments may also use the location determination to send location-specific information to the gaming communication device. For example, a reminder that an entertainment event to which the user has tickets is about to begin may be sent to the user's device if the device (and therefore the user) is located in a different part of the casino complex. In another embodiment, a user may be alerted that the user's favorite dealer is on the casino floor if the user is located in his or her guest room.

In various embodiments, the location of the gaming communication device may be used to deliver goods and services purchased or ordered by the user of the device. For example, in various embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user that he/she has gotten off-course and then plot a new course to the desired destination.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

User Profiles

According to various embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

Various embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino, may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In various embodiments, user profile information may include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

Alerts

In some embodiments, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity. As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur and what the alerts indicate may be customized or tailored according to user preferences (or any other information maintained about the user (e.g., in a user profile).

In some embodiments, an alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner. Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to some embodiments, directional information may be provided to one or more users. The directional information may be associated with an alert. The directional information may be based on any of the parameters described herein (e.g., profiles, alerts, locations, changes in play or other activities, etc). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to various embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to various embodiments, the operation of the alerts module and the alerts methods are integrated with various techniques for managing user profile information. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance an alert might be triggered by a certain time or the occurrence of a certain event (e.g., the odds given on a certain sports event changing by a certain predetermined amount).

Service Applications

According to various embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As an another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

Peer-to-Peer Wireless Gaming

According to various embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In various embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes gamers." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet these criteria for the initiation of a peer-to-peer gaming event.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Gaming and Wireless System

Various embodiments include a gaming system including hand-held personal gaming devices. The gaming system is adapted to present one or more games to a user of one of the hand-held gaming devices.

In various embodiments, the gaming system includes a portable gaming device or interface. The portable gaming device has a display for displaying game information to a player, at least one input device for receiving input from the player and is capable of receiving and sending information to a remote device/location. The gaming system also includes a game server for generating game data, transmitting game data to the portable gaming device and receiving information, such as player input, from the portable gaming device. The gaming system further includes a payment transaction server for validating payment and establishing entitlement of a player to play a game via the portable gaming device as provided by the game server.

In various embodiments, the gaming system includes one or more stationary gaming machines or other devices capable of printing tickets having a value associated therewith. The portable gaming device includes a ticket reader for reading ticket information for use by the payment transaction server in verifying the associated value for permitting the player to play the game.

In one or more embodiments, the portable gaming devices communicate with other devices (such as the game server) via a wireless communication channel. Appropriate relays and transceivers are provided for permitting the wireless communication.

In one or more embodiments, the portable gaming device includes a plurality of interfaces for changing the configuration of the gaming device or interacting with one or more transaction servers. In some embodiments, a login interface is provided for receiving login information regarding a user of the device. In various embodiments, the number of interfaces or other functions or features displayed or permitted to be accessed are configured depending upon the user of the device. In the event a gaming representative identifies himself, interfaces permitting access to a variety of control functions may be provided. In the event a player identifies themselves, such control functions may not be accessible, but instead only consumer-related functions may be accessible such as game play.

In one or more embodiments the gaming system includes one or more transaction servers, such as a food transaction server. Using an interface of the portable gaming device a player or other user may request services from the food transaction server. For example, a player may request food, drink, a restaurant reservation or other service.

One or more embodiments comprise a method of playing a game via a portable gaming device associated with a gaming network. In some embodiments, a player obtains a portable gaming device, such as by checking out the device from the hostess station of a restaurant or the front desk of a hotel/casino. The player provides value to the gaming operator, such as a credit card or cash deposit. This value is associated with the server and matched with a ticket number, player tracking number or other identifier.

The game device is configured for player play using the login interface. The act of logging in may be performed by the player or the gaming operator. The player next establishes entitlement to obtain services, such as the playing of a game, by showing the existence of value. In some embodiments, the player scans his ticket using the ticket reader of the device. The scanned information is transmitted to the payment transaction server for verifying entitlement of the player to play a game or obtain other services. In the event the entitlement is verified, then the player is permitted to engage in the play of a game or request service.

In the event a player wishes to play a game, the player indicates such by selecting a particular game using a game play interface. Upon receipt of such an instruction, the game server generates game data and transmits it to the personal gaming device. The transmitted data may comprise sound and video data for use by the personal gaming device in presenting the game. The player is allowed to participate in the game by providing input to the game server through the personal gaming device. The game server determines if the outcome of the game is a winning or losing outcome. If the outcome is a winning outcome, an award may be given. This award may be cash value which is associated with the player's account at the payment transaction server. If the outcome is a losing outcome, then a bet or wager placed by the player may be lost, and that amount deducted from the player's account at the transaction server.

Figure 8:
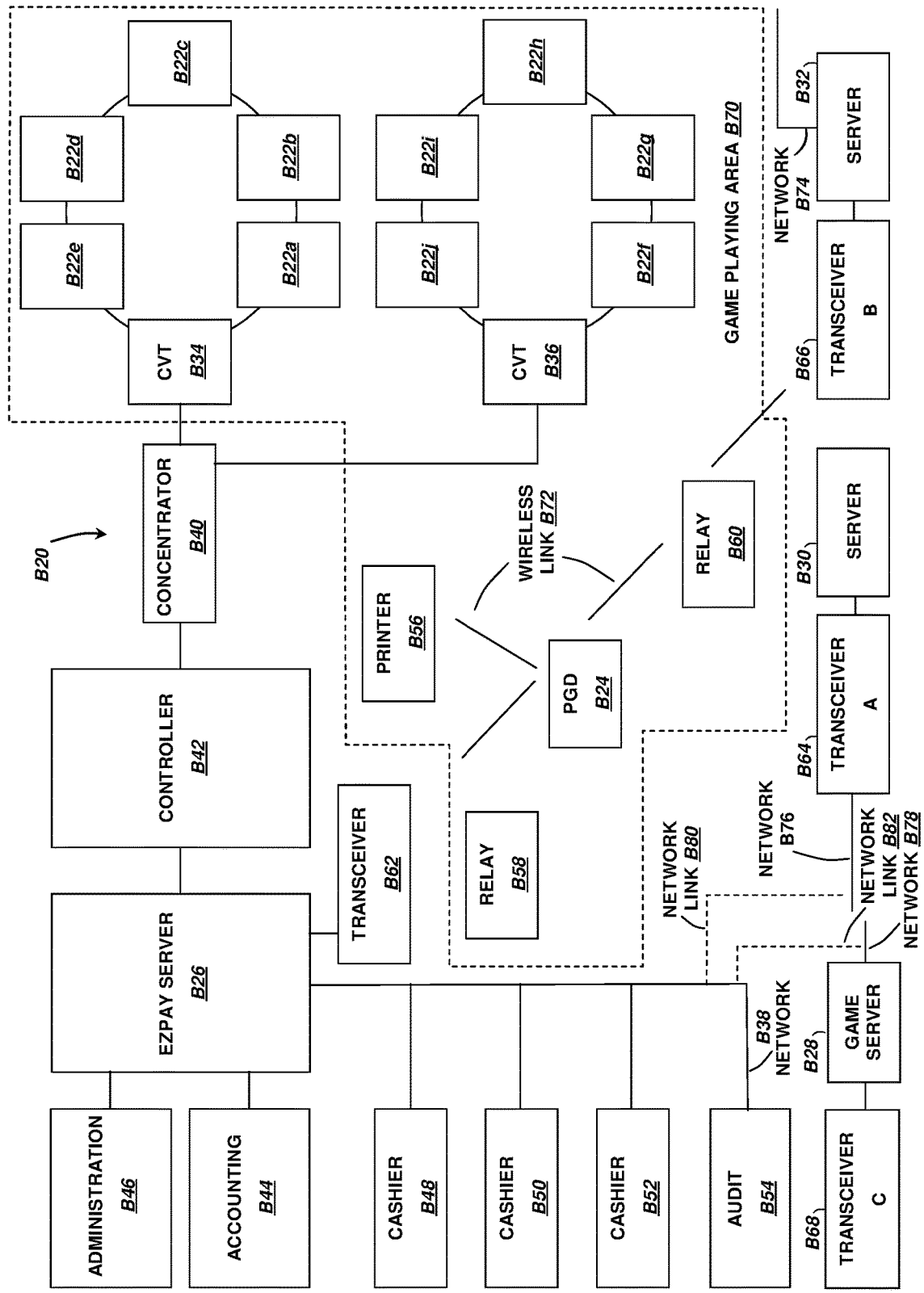
FIG. 8 is a block diagram of a gaming system in accordance with some embodiments.

FIG. 8 is a block diagram of a gaming system in accordance with various embodiments.

As illustrated, the gaming system B20 includes a plurality of gaming machines B22*a*, B22*b*, B22*c*, B22*d*, B22*e*, B22*f*, B22*g*, B22*h*, B22*i*, B22*j*. In some embodiments, these gaming machines B22*a*, B22*b*, B22*c*, B22*d*, B22*e*, B22*f*, B22*g*, B22*h*, B22*i*, B22*j* are of the stationary type. In general, the gaming machines B22*a*, B22*b*, B22*c*, B22*d*, B22*e*, B22*f*, B22*g*, B22*h*, B22*i*, B22*j* are arranged to present one or more games to a player. In various embodiments, the games are of the type requiring the placement of a wager or bet and are of the type by which a player receiving a winning outcome is provided an award, such as a monetary award. These devices may comprise for example, video poker and slot machines. In addition, the gaming system B20 includes one or more hand-held, portable gaming devices (PGDs) B24. The PGD B24 is also arranged to present one or more games to a player, and as described below, may be used as an access point for a variety of other services. The device referred to herein as a "personal gaming device" may be referred to by other terminology, such as a portable gaming interface, personal game unit or the like, but regardless of the name of the device, such may have one or more of the characteristics herein.

In addition, in various embodiments, the PGD B24 is in communication with at least one gaming server B28. As described below, in various embodiments, the one or more games which are presented via the PGD B24 to the player are provided by the gaming server B28.

The gaming machines B22*a*, B22*b*, B22*c*, B22*d*, B22*e*, B22*f*, B22*g*, B22*h*, B22*i*, B22*j* and each PGD B24 is in communication with a payment system referred to herein as the "EZ-Pay" system. This system includes a server B26 for receiving and transmitting information. In general, the EZ Pay system is utilized to accept payment from a player for the playing of games and obtaining of other goods and services, and for paying a player winnings or awards.

In the embodiments illustrated, the gaming system B20 includes other servers B30, B32 for transmitting and/or receiving other information. In some embodiments, one server B30 comprises a prize transaction server. Another server B32 comprises a food transaction server. In a some embodiments, information may be transmitted between the PGD B24 and these servers B30, B32.

The EZ Pay system, according to various embodiments, will now be described in more detail with reference to FIG. 9. The EZ Pay system may constitute an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 9:
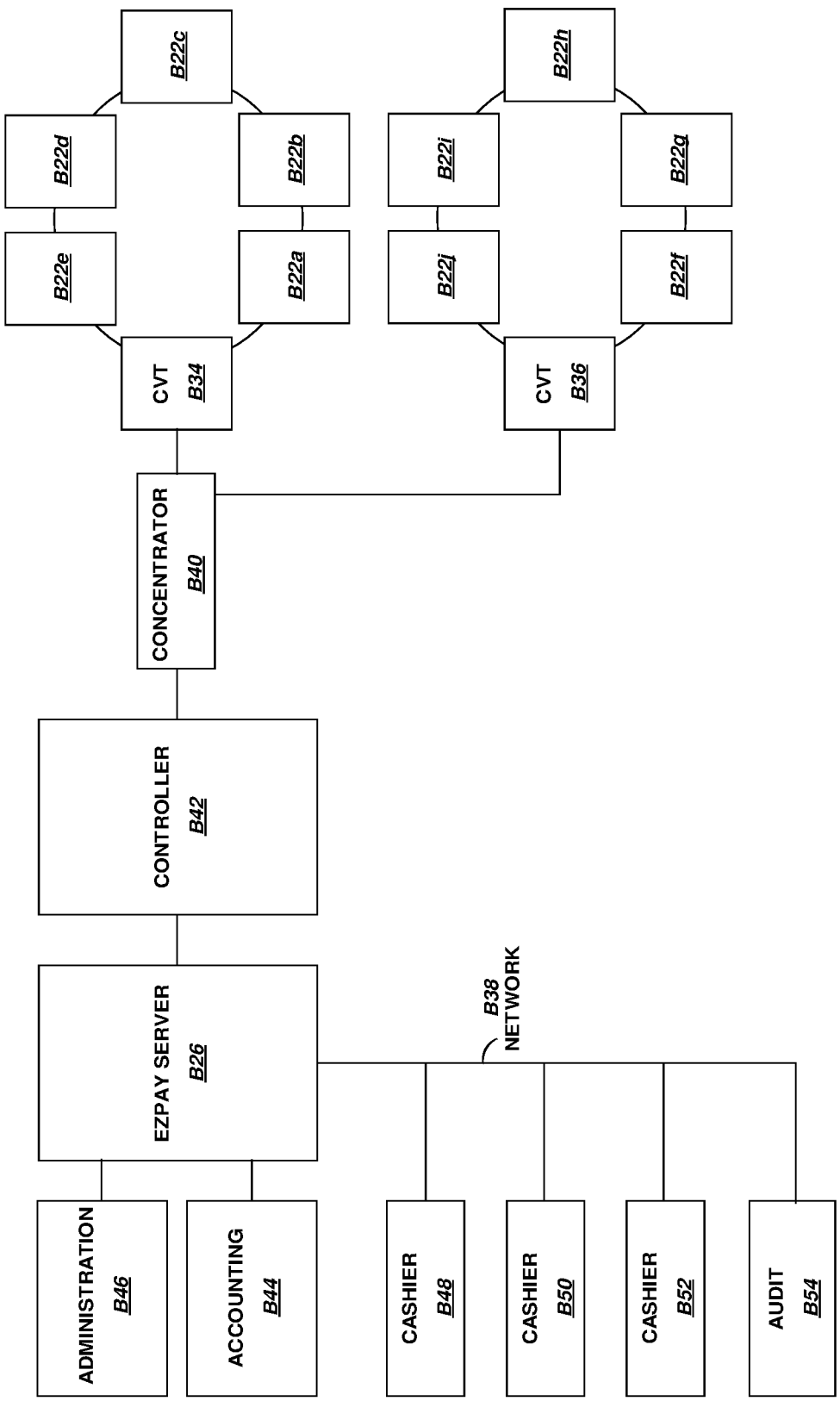
FIG. 9 is a block diagram of a payment system forming a part of the gaming system illustrated in FIG. 8, according to some embodiments.

FIG. 9 illustrates some embodiments of such a system in block diagram form. As illustrated, a first group of gaming machines B22*a*, B22*b*, B22*c*, B22*d*, and B22*e* is shown connected to a first clerk validation terminal (CVT) B34 and a second group of gaming machines B22*f*, B22*g*, B22*h*, B22*i*, and B22*j* is shown connected to a second CVT B36. All of the gaming machines print ticket vouchers which may be exchanged for cash or accepted as credit or indicia in other gaming machines. When the CVTs B34,B36 are not connected to one another, a ticket voucher printed from one gaming machine may only be used as indicia of credit in another gaming machine which is in a group of gaming machines connected to the same CVT. For example an award ticket printed from gaming machine B22*a* might be used as credit of indicia in gaming machines B22*b*, B22*c*, B22*d*, and B22*e*, which are connected to the common CVT B34, but may not be used in gaming machines B22*f*, B22*g*, B22*h*, B22*i*, and B22*j* since they are each connected to the CVT B36.

The CVTs B34,B36 store ticket voucher information corresponding to the outstanding ticket vouchers that are waiting for redemption. This information is used when the tickets are validated and cashed out. The CVTs B34,B36 store the information for the ticket vouchers printed by the gaming machines connected to the CVT. For example, CVT B34 stores ticket voucher information for ticket vouchers printed by gaming machines B22*a*, B22*b*, B22*c*, B22*d*, and B22*e*. When a player wishes to cash out a ticket voucher and the CVTs B34,B36 are not connected to one another, the player may redeem a voucher printed from a particular gaming machine at the CVT associated with the gaming machine. To cash out the ticket voucher, the ticket voucher is validated by comparing information obtained from the ticket with information stored with the CVT. After a ticket voucher has been cashed out, the CVT marks the ticket as paid in a database to prevent a ticket voucher with similar information from being cashed multiple times.

Multiple groups of gaming machines connected to the CVTs B34,B36 may be connected together in a cross validation network B38. The cross validation network typically comprises one or more concentrators B40 which accept input from two or more CVTs and enables communications to and from the two or more CVTs using one communication line. The concentrator B40 is connected to a front end controller B42 which may poll the CVTs B34,B36 for ticket voucher information. The front end controller B42 is connected to an EZ pay server B26 which may provide a variety of information services for the award ticket system including accounting B44 and administration B46.

The cross validation network allows ticket vouchers generated by any gaming machine connected to the cross validation network to be accepted by other gaming machines in the cross validation network B38. Additional, the cross validation network allows a cashier at a cashier station B48, B50, B52 to validate any ticket voucher generated from a gaming machine within the cross validation network B38. To cash out a ticket voucher, a player may present a ticket voucher at one of the cashier stations B48, B50, B52. Information obtained from the ticket voucher is used to validate the ticket by comparing information on the ticket with information stored on one of the CVTs B34,B36 connected to the cross validation network B38. As tickets are validated, this information may be sent to another computer B54 providing audit services.

As described above, the gaming system B20 may also include one or more hand-held PGDs B24. In various embodiments, the PGD B24 is a portable device capable of transmitting and receiving information via a wireless communication link/network.

Referring again to FIG. 8, the gaming system B20 may include a printer B56, wireless communication relays B58 and B60, and wireless transceivers B62, B64, B66 and B68 connected to the remote transaction servers B26, B28, B30 and B32. In various embodiments, a player may obtain the PGD B24, and after being provided with the appropriate authority, may play one or more games and/or obtain other services including food services or accommodation services.

Figure 10:
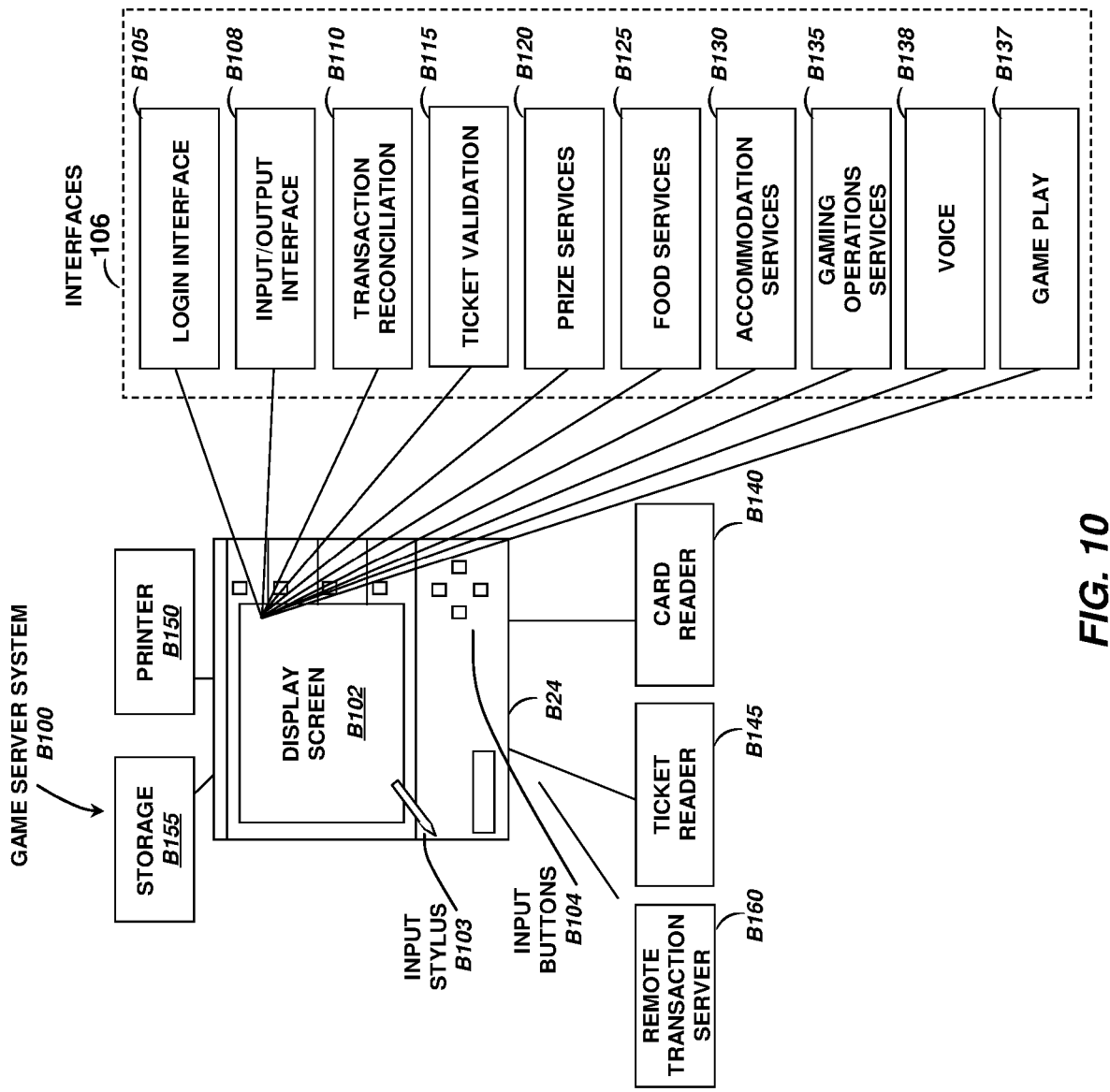
FIG. 10 is a schematic diagram of a portable gaming device of the gaming system illustrated in FIG. 8, according to some embodiments.

FIG. 10 illustrates the PGD B24 and a block diagram of a game and service system which may be implemented by the gaming system B20 illustrated in FIG. 8. In various embodiments, the game and service system B100 is comprised of at least one PGD B24 and a number of input and output devices. The PGD B24 is generally comprised of a display screen B102 which may display a number of game service interfaces B106. These game service interfaces B106 are generated on the display screen B102 by a microprocessor of some type (not shown) within the PGD B24. Examples of a hand-held PGD B24 which may accommodate the game service interfaces B106 shown in FIG. 10 are manufactured by Symbol Technologies, Incorporated of Holtsville, N.Y. The interface or menu data may be stored in a local memory, or the data may be transmitted to the PGD B24 from a remote location (such as a data server). This reduces the memory requirement of the device.

The game service interfaces B106 may be used to provide a variety of game service transactions and gaming operations services, including the presentation for play by a user of one or more games. The game service interfaces B106, including a login interface B105, an input/output interface B108, a transaction reconciliation interface B110, a ticket validation interface B115, a prize services interface B120, a food services interface B125, an accommodation services interface B130, a gaming operations interface B135, and a game play interface B137 may be accessed via a main menu with a number of sub-menus that allow a game service representative or player to access the different display screens relating to the particular interface.

In one or more embodiments, some or all of the interfaces may be available to a user of the PGD B24. For example, in one or more embodiments, the PGD B24 may have a dual purpose of both being usable by a player to play games and engage in other activities, and also be used by gaming operations personnel for use in providing services to players and performing administrative functions. In various embodiments, certain PGDs B24 may be specially configured for use only by players, and other PGDs B24 may be specially configured for use only by gaming or other personnel. In such event, the interfaces B106 may be custom programmed.

In one or more embodiments, only certain interfaces B106 may be displayed, depending on the status of the user of the PGD B24. In some embodiments, the particular interfaces B106 which are displayed and thus accessible for use are determined by the status of the user as indicated through a login function. In various embodiment, when the PGD B24 is operable (such as when a power button is activated) the default status for the PGD B24 is the display of the login interface B105. Once a user of the PGD B24 has logged in, then the status of the PGD display is changed.

In one or more embodiments, the login interface B105 may allow a game service representative to enter a user identification of some type and verify the user identification with a password. When the display screen B102 is a touch screen, the user may enter the user/operator identification information on a display screen comprising the login interface B105 using an input stylus B103 and/or using one or more input buttons B104. Using a menu on the display screen of the login interface, the user may select other display screens relating to the login and registration process. For example, another display screen obtained via a menu on a display screen in the login interface may allow the PGD B24 to scan a finger print of the game service representative for identification purposes or scan the finger print of a game player.

In the event a user identifies themselves as a gaming operator or representative, then the PGD B24 may be arranged to display one or more other interfaces such as those listed above and described in detail below. In one or more embodiments, the default status or login may be a "player" mode login.

In various embodiments, the login interface B105 may allow a player to identify themselves to configure the PGD B24 to permit the player to access a plurality of player services, such as playing games and the like. In various embodiments, the login interface B105 includes a request that the user identify themselves as a "player" or "authorized personnel." In the event "authorized personnel" is selected, then the above-referenced user identification (including password) may be requested. If "player" is selected, then in various embodiments the player is requested to provide an EZ pay ticket. As described in more detail below, in various embodiments, a player who wishes to play one or more games or obtain other goods or services uses an EZ pay ticket to provide the credit or payment therefor. The ticket may be obtained from a cashier or by play of another gaming device (such as devices B22a, B22b, B22c, B22d, B22e, B22f, B22g, B22h, B22i, B22j in FIG. 8). The ticket may be verified through the EZ pay system described above.

In various embodiments, the PGD B24 includes a ticket reader B145 and a card reader B140. In some embodiments, the ticket reader B145 may be of a variety of types. In some embodiments, the reader comprises a bar-code reading optical scanner. In this arrangement, a user of the PGD B24 may simply pass the bar-coded ticket in front of the bar-code reader. In some embodiments, the card reader B140 comprises a magnetic-stripe card type reader for reading information associated with a magnetic stripe of a card, such as a player tracking card.

After having provided the appropriate authorization, access may be provided to the user of the PGD B24 of one or more of the following interfaces B106.

In one or more embodiments, an authorized user may be provided with access to the input/output interface B108. In a various embodiments, such access is only provided to a game service operator and not a player. In one or more embodiments, the input/output interface B108 permits a user to select, from a list of devices stored in memory on the PGD B24, a device from which the PGD may input game service transaction information or output game service transaction information. For example, the PGD B24 may communicate with the ticket reader B145. As another example, the PGD B24 may input information from the card reader B140. Such input may be useful, for example, if a game service operator wishes to verify the authenticity of a player tracking card or the like.

The PGD B24 may output game and service transaction information to a number of devices. For example, to print a receipt, the PGD B24 may output information to a printer B150. In this game service transaction, the PGD B24 may send a print request to the printer B150 and receive a print reply from the printer B150. The printer B150 may be a large device at some fixed location or a portable device carried by the game service representative. As another example, the output device may be the card reader B140 that is able to store information on a magnetic card or smart card. Other devices which may accept input or output from the PGD B24 are personal digital assistants, microphones, keyboard, storage devices, gaming machines and remote transaction servers.

The PGD B24 may communicate with the various input mechanisms and output mechanisms using both wire and wire-less communication interfaces. For example, the PGD B24 may be connected to the printer B150 by a wire connection of some type. However, the PGD B24 may communicate with a remote transaction server B160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wireless communication interfaces may be encrypted to provide security for certain game service transactions such as validating a ticket for a cash pay out. Some devices may accommodate multiple communication interfaces. Such a spread spectrum network is but one possible communication scheme.

Another type of interface that may be stored on the PGD B24 is the award ticket validation interface B115. In some embodiments, this interface is only available to an authorized game service representative, and not a player. Some embodiments of the award ticket interface B115 may accommodate the EZ pay ticket voucher system and validate EZ pay tickets as previously described. However, when other ticket voucher systems are utilized, the award ticket validation interface B115 may be designed to interface with the other ticket voucher systems. Using the award ticket validation interface B115, a game service representative may read information from a ticket presented to the game service representative by a game player using the ticket reader and then validate and pay out an award indicated on the ticket.

In various embodiments, the award ticket contains game service transaction information which may be verified against information stored on a remote transaction server B160. To validate the ticket may require a number of game service transactions. For example, after obtaining game service transaction information from the award ticket, the PGD B24 may send a ticket validation request to the remote transaction server B160 using the spread spectrum communication interface and receive a ticket validation reply from the remote server B160. In particular, the validation reply and the validation request may be for an EZ pay ticket. After the award ticket has been validated, the PGD B24 may send a confirmation of the transaction to the remote server B160. Details of the game service transaction information validation process are described with the reference to FIG. 12. In various embodiments, the award ticket interface may be configured to validate award information from a smart card or some other portable information device or validate award information directly from a gaming machine.

As game and service transactions are completed, game and service transaction information may be stored on a storage device B155. The storage device B155 may be a remote storage device or a portable storage device. The storage device B155 may be used as a back-up for auditing purposes when the memory on the PGD B24 fails and may be removable from the PGD B24.

A type of game service interface that may be stored on the PGD B24 is the prize service interface B120. As an award on a gaming machine (i.e., machines B22a, B22b, B22c, B22d, B22e, B22f, B22g, B22h, B22i, B22j in FIG. 8) or while playing a game via the PGD B24, a game player may receive a ticket (such as issued by other machine) that is redeemable for merchandise including a bicycle, a computer or luggage or receive such an award directly (such as while playing the PGD B24 itself). Using the prize service interface B120, a game service representative or player may validate the prize service ticket and then check on the availability of certain prizes. For example, when the prize service ticket indicates the game player has won a bicycle, the game service representative may check whether the prize is available in a nearby prize distribution center. Alternatively, a player may be permitted to do the same thing. In some embodiments, a player may be awarded a prize of a particular level, there being one or more particular prizes on that level. In such events, the player may use the interface B120 to determine what prizes are currently available in the prize level just awarded. The PGD B24 may validate a prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, to check on the availability of prizes and to order or ship a prize may be implemented using various display screens located within the prize interface. The different prize screens in the prize service interface B120 may be accessed using a menu located on each screen of the prize service interface. In some embodiments, the prize service interface B120 may be configured to validate prize information from a smart card or some other portable information device or validate award information directly from a gaming machine.

A type of game service interface that may be stored on the PGD B24 is the food service interface B125. As an award on a gaming machine or as compensation for a particular amount of game play, a game player may receive a free food or drink. Using the food service interface B125, the player may redeem the food or drink award, or a game service representative may validate such an award (for example, the award may be provided to a player of a gaming device B22a in the form of a ticket) and check on the availability of the award. For example, when the game player has received an award ticket valid for a free meal, the food service interface may be used to check on the availability of a dinner reservation and make a dinner reservation. As another example, the PGD B24 may be used to take a drink or food order by the player thereof. Such an order may be processed via the remote food server B32 (see also FIG. 8). The transactions needed to validate a food ticket or award, to check on the availability of food services, request a food service and receive a reply to the food service request may be implemented using various display screens located within the food service interface B125. These display screens may be accessed using a menu located on each screen of the food service interface. In some embodiments, the food service interface may be configured to validate food service information from a smart card or some other portable information device.

Another type of game service interface that may be stored on the PGD B24 is an accommodation service interface B130. As an award for game play or as compensation for a particular amount of game play, a game player may receive an award in the form of an accommodation service such as a room upgrade, a free night's stay or other accommodation prize. using the accommodation service interface B130, the player may check on the availability of certain accommodation prizes. For example, when the game player has received an award for a room upgrade, the accommodation service interface may be used to check on the availability of a room and to make a room reservation. Regardless of whether the player has won an accommodation award, the player may utilize the accommodation service interface B130 to reserve a room (such as an additional night's stay) or an upgrade to a room. In some embodiments, a player of a game may be issued a ticket (such as from a free-standing game device B22a, B22b, B22c, B22d, B22e, B22f, B22g, B22h, B22i, B22j in FIG. 8), and a gaming representative may use the accommodation service interface B130 in order to validate the player's award ticket and check on the availability of the award and institute the award. As another example, the PGD B24 may be used to order a taxi or some other form of transportation for a player at a gaming machine preparing to leave the game playing area. The game playing area may be a casino, a hotel, a restaurant, a bar or a store.

The PGD B24 may validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In some embodiments, the accommodation service interface may be configured to validate accommodation service information from a smart card or some other portable information device.

A type of game service interface that may be stored on the PGD B24 is a gaming operations service interface B135. Using the gaming service interface B135 on the PGD B24, a game service representative may perform a number of game service transactions relating to gaming operations. For example, when a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the PGD B24. In one or more embodiments, a player may be permitted various options through the gaming service interface B135. For example, a player may be permitted to request a gaming service representative or attendant using the interface B135.

A type of game service interface that may be stored on the PGD B24 is a transaction reconciliation interface B110. In various embodiments, the PGD B24 contains a memory storing game service transaction information. The memory may record the type and time when a particular game service transaction is performed. At certain times, the records of the game service transactions stored within the PGD B24 may be compared with records stored at an alternate location. For example, for an award ticket validation, each time an award ticket is validated and paid out, a confirmation is sent to a remote server B160. Thus, information regarding the award tickets, which were validated and paid out using the PGD B24, should agree with the information regarding transactions by the PGD stored in the remote server B160. The transaction reconciliation process involves using the transaction reconciliation interface B110 to compare this information. In various embodiments, only a gaming service representative (and not a player) is permitted access to the transaction reconciliation interface B110.

A type of game service interface that may be stored on the PGD B24 is a voice interface B138. Using the spread spectrum cellular or other communication network incorporated into the PGD, a player and/or game service representative may use the PGD B24 as a voice communication device. This voice interface B138 may be used to supplement some of the interfaces previously described. For example, when a game player spills a drink the game service representative may send maintenance request and receive a maintenance reply using the voice interface B138 on the PGD B24. As another example, when a game player requests to validate a food service such as free meal, such a request may be made by the player or a game service representative at a restaurant or other location using the voice interface B138 on the PGD B24. In some embodiments, a player may be permitted to contact a player of another PGD B24, such as by inputting a code number assigned to the PGD B24 through which communication is desired. Such would permit, for example, a husband and wife using two different PGDs B24 to communicate with one another. The voice interface B138 may also permit a player to contact the front desk of a hotel/casino, an operator of a switchboard at the gaming location or the like.

A type of game service interface that may be stored on the PGD B24 is a game play interface B137. In various embodiments, a player is permitted to access the game play interface B137 in order to select from one or more games for play. The game play interface B137 may include a menu listing one or more games which the player may play via the PGD B24. In various embodiments, game play is facilitated with the game server B28 (see FIG. 8).

In one or more embodiments, the gaming control code is not resident at the PGD B24, but instead at a secure, remote server. Referring to FIG. 8, game play data is transmitted from the game server B28 to the PGD B24, and from the PGD B24 to the game server B28. Preferably, the PGD B24 is adapted to receive and process data, such as by receiving video data and processing the data to present the information on the display B102. Likewise, the PGD B24 is arranged to accept input and transmit that input or instruction to the game server B28. This arrangement has the benefit that nearly all aspects of the play of a game can be monitored, as it requires the game play data to pass to or from a remote location. This avoids, for example, storage of the gaming software at the PGD B24 where it might be tampered with, copied or the like.

In one or more embodiments, each PGD B24 has a unique identifier which is utilized to identify which PGD B24 data is transmitted from and to which data is to be transmitted to. In some embodiments, the game server B28 may thus be used to present the same or different games to a plurality of players using different PGDs B24, with the game data regarding a particular game being played at a particular PGD B24 being directed to that PGD B24 using its particular identifier.

As will be appreciated by those of skill in the art, the PGD B24 may have a variety of configurations. As stated above, the PGD B24 may be used in the gaming system B20 in which gaming code is not stored directly at the PGD. In such an embodiment, the PGD B24 may have a much more limited amount of data memory. In some embodiments, the PGD B24 includes a processor for executing control code, such as that necessary to operate the display B102, accept input from the stylus B103 or input buttons B104 or the like. In addition, the PGD B24 preferably includes a buffer memory for accepting data transmitted from the game server B28. This data may comprise data for displaying game information, such as video and sound content.

Various aspects of the use of the PGD B24 described above will now be described. In one or more embodiments, the PGD B24 may be used directly by a player. In various embodiments, a player may use the PGD B24 to play one or more games, and obtain products and services, such as food.

Figure 11:
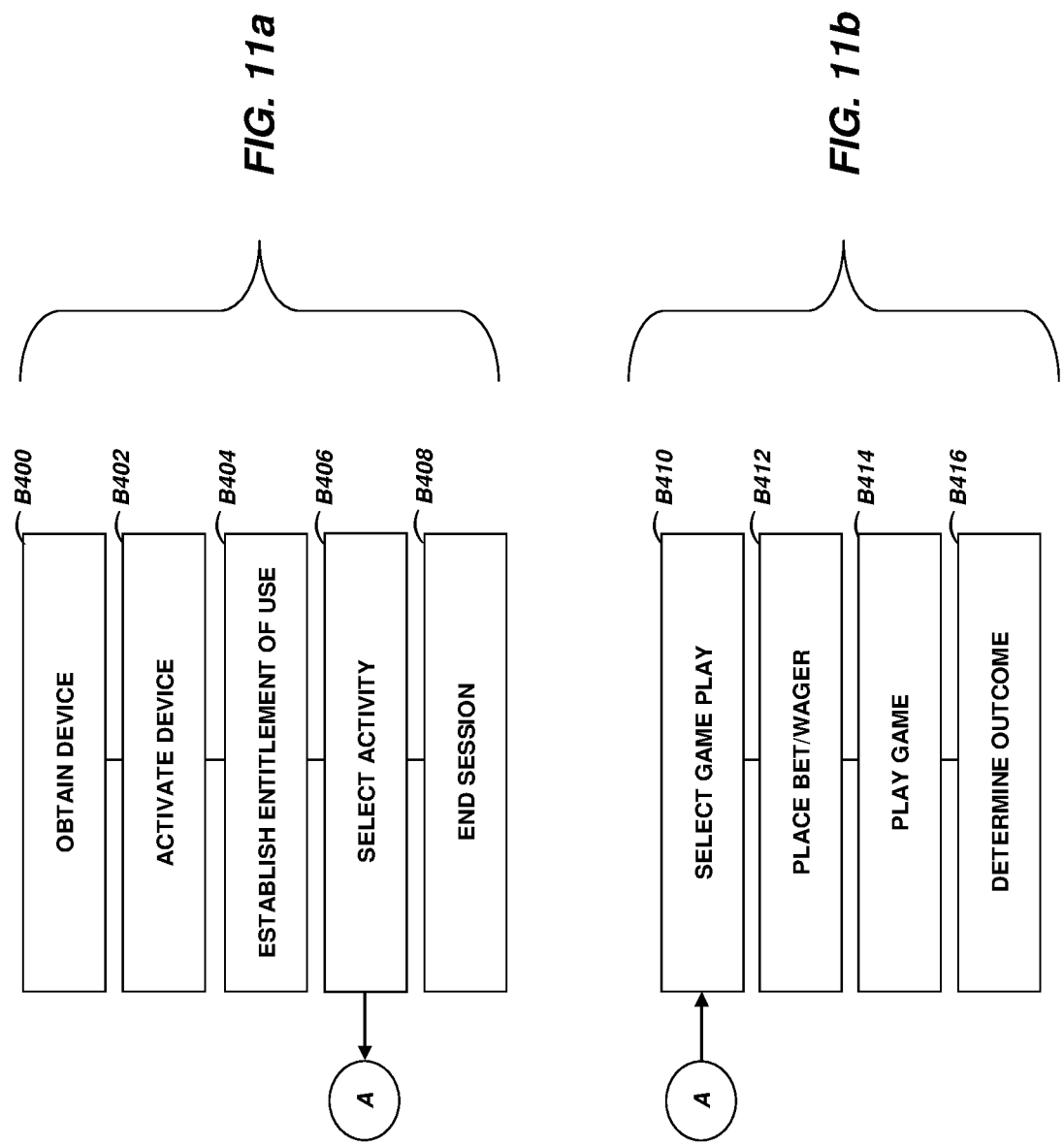
FIG. 11(*a*) is a flow diagram of a method of use of a portable gaming device by a player, according to some embodiments.

A method of use of the PGD B24, according to some embodiments, is illustrated in FIGS. 11(a) and 11(b). In general, a player must first obtain a PGD B24. For example, a player may check out a PGD B24 from a gaming operator. The player then establishes entitlement to use the PGD B24. In some embodiments, the player must indicate player status at the login interface, and obtain a valid ticket in order to activate the PGD B24. Once activated, the player is permitted to engage in a variety of transactions using the interfaces B106, such as playing a game, redeeming prizes and awards, placing food and drink orders, placing reservations, seeking gaming operator support and seeking a variety of other goods and services as described in more detail below.

One example of a method of use of the PGD B24 by a player will be described with reference to FIG. 11(a). In a first step B400, the player first obtains the PGD B24. In some embodiments, a gaming operator may have certain locations at which a player may obtain the PGD B24, such as the front desk of a hotel/casino, the hostess stand at a restaurant, from a gaming attendant or other location as desired. In some embodiments, a gaming operator may actually permit a player to retain the PGD B24, such as by renting, selling or giving the PGD B24 away to a player.

In a step B402, the PGD B24 is activated. In some embodiments, this step includes turning on the PGD B24 (such as with a power switch) and logging in. In some embodiments, when the PGD B24 is turned on, the login interface B105 is automatically displayed. The login interface B105 may include "player" and "authorized personnel" buttons which may be activated using the stylus B103. The player may indicate "player" status by selecting the player button with the stylus B103.

In some embodiments, the gaming operator may log the player in. For example, when a player obtains the PGD B24 from a hostess at a restaurant, the hostess may log in the player in player mode. In some embodiments, the gaming operator may have certain PGDs B24 which are for use by players and certain others which are for use by gaming personnel. In such event, the PGDs B24 which are configured for player status may automatically be configured for player mode after being turned on.

In a step B404, a player establishes entitlement to use the PGD B24. In some embodiments, this step comprises the player providing a valid ticket which is verifiable using the EZ pay portion of the gaming system B20. In some embodiments, a player may have obtained a ticket through play of a gaming machine, such as gaming machines B22a, B22b, B22c, B22d, B22e, B22f, B22g, B22h, B22i, B22j of the gaming system B20. In some embodiments, a player may be issued a ticket by a game service representative. For example, a player may provide credit at a cashier cage (such as with a credit card or cash) and be issued a ticket. A player may also pay cash or the like to a restaurant hostess and be issued a ticket.

Once the player has a ticket, the ticket may be scanned using the ticket reader B145 of the PGD B24. For example, the player may pass the ticket in front of the ticket reader B145. Once the information is read by the PGD B24, the data may be transmitted to the EZ pay server B26 for validation. Preferably, this validation confirms that the particular ticket is authorized, including the fact that it is outstanding and has value associated therewith.

In one or more embodiments, entitlement may be established in other manners. For example, in some embodiments, entitlement may be established with a player tracking or identification card which may be read using the card reader B140 of the PGD B24.

Establishing entitlement to use the PGD B24 may ensure that the player has funds for paying to obtain services and products available by use of the PGD B24. In one or more embodiments, however, this step may be eliminated. For example, in some embodiments, a player may be permitted to use the PGD B24 and then pay for goods or services in other manners. In some embodiments, a player may, for example, order food and then pay the server for the food using a room charge or cash at the time the food is delivered. In some embodiments, a player may use a credit card to pay to play games or to pay for food or the like. In such event, a credit card may be read by the card reader B140 at the time the services or products are to be provided or are ordered by the player.

In a step B406, the player is then permitted to select one or more selections from the interfaces B106. As stated above, a player may not be permitted access to all of the interfaces B106. In any event, a player may select, such as with the stylus B103, a service from the group of interfaces B106. An example of the engagement of a particular activity using the PGD B24 will be described below with reference to FIG. 11(b).

Once a player no longer desires to engage in any more activities using the PGD B24, the use session of the PGD B24 is ended in a step B408, and in one or more embodiments, the PGD B24 is returned to the gaming operator. In various embodiments, once a player no longer wishes to use the PGD B24, the player returns the PGD B24 to the gaming operator. At that time, the gaming operator may confirm that all transactions using the PGD B24 are closed or complete, and pay the player any winnings. In some embodiments, a player B24 is issued a new ticket representing the player's credit (including any payments made in order to first use the PGD B24, plus any winnings, less any expenditures).

An example of a method of using the PGD B24 wherein the player has selected the option of game play using the game play interface B137 will be described in detail with reference to FIG. 11(b). In a step B410 (which step comprises a particular embodiment of step B406 of FIG. 11(a)), a player has selected the event or service of "game play" using the game play interface B137.

In some embodiments, when a player has selected the game play interface B137, a menu may be displayed to the player of the one or more games which the player may be permitted to play. In some embodiments, when the player selects the game play interface B137, a signal is transmitted from the PGD B24 to the remote game server B28 instructing the game server B28 that the player wishes to play a game. In response, the game server B28 may send the latest game menu to the PGD B24 for display. In this arrangement, the menu of games which is available may be continuously updated at one or more central locations (such as the server B28) instead of at each PGD B24.

If the system B20 permits the player to select a game from a menu of games, then the method includes the step of the player selecting a particular game to be played. Once a game is selected, or if only a single game option is provided, then game play begins. In some embodiments, the game server B28 transmits data to the PGD B24 for use by the PGD B24 in presenting the game, such as video and audio content.

In some embodiments, in a step B412 a player is required to place a bet or ante to participate in a game. In some embodiments, the player may place the bet or ante using the EZ pay system. As stated above, the player preferably establishes entitlement to use the PGD B24 with an EZ pay ticket or other entitlement, which ticket demonstrates that the player has monies or credits on account which may be used to pay for goods and services. These services include game play services.

In some embodiments, when the player establishes entitlement to use the PGD B24, the value of the player's credits or monies are displayed to the player so that the player is visually reminded of these amounts. When a player begins play of a game, the player may input a bet and ante which is no more than the value of the credits or monies which the player has on account. Once a player has placed a bet or ante, that information is transmitted to the EZ pay server B26 and is deducted from the player's account. A new credit value is then displayed at the PGD B24 to the player.

In various embodiments, a player may provide credit for a bet or ante in other manners. For example, a player may swipe a credit card through the card reader B140 in order to provide the necessary credit for the bet or ante.

In a step B414, the player is then permitted to engage in the game. In some embodiments, game play comprises the game server B28 executing game code and transmitting information to the PGD B24 for presenting certain aspects of the game to the player. When necessary, the player is permitted to provide input, and the input data is transmitted from the PGD B24 to the game server B28.

As one example of a game, the game may comprise video poker. In this embodiment, the game server B28 executes code for randomly generating or selecting five cards. Data representing video images of the cards is transmitted to the PGD B24, where the images of the five dealt cards are displayed on the display screen B102.

The instruction "draw" or "stay" may be displayed to the player. At that time, the player may select one or more of the cards to hold or replace. In the event the player elects to replace any card, that instruction is transmitted to the game server B28 which then randomly generates or selects replacement cards. The replacement card data is transmitted to the PGD B24 and images of the replacement cards are displayed.

In the event the hand of five cards (including any replacement cards) is determined by the game server B28 to comprise a predetermined winning hand, then the player may be paid a winning amount. If not, then the player loses his bet or ante. This step comprises step B416 of the method, that of determining the outcome of the game.

If the outcome is a winning outcome, then the player may be paid a winning by crediting the player's account through the EZ pay server B26. In that event, the player's credits value as displayed is updated to reflect the player's winnings.

A player may then elect to play the game again, play a different game, or select one or more other services offered. In some embodiments, a "return to main menu" button or the like may be displayed to the player at all times, permitting the player to return to a display including the various interfaces B106.

In some embodiments, when the player has completed use of the PGD B24, the player returns the PGD B24 to the gaming operator. For example, the player may return the PGD B24 to a cashier cage or a game service operator. In various embodiments, the game service operator or other party then issues the player a ticket for any credit or value which remains in the player's account. The PGD B24 may then be deactivated so that it readied for use by another player. In some embodiments, the PGD B24 may be deactivated by turning its power off. In some embodiments, a "logout" interface or option may be provided which causes the PGD B24 to return to a default state seeking the login of a player or user.

The PGD B24 may be used by a game service operator. Several examples of a method of such use are detailed below in conjunction with FIGS. 8 and 9.

When a game service representative contacts a game player seeking a game service in the game playing area B70 (see FIG. 8), the game service representative uses an appropriate game service interface on the display screen of the PGD B24, as described with reference to FIG. 10, to provide the game service requested by the game player. For example, when a game player requests an EZ pay ticket validation, the game service representative brings the EZ pay ticket validation interface onto the display screen of the PGD B24 using menus available on the display screen B102. Then, the game service representative scans the EZ pay ticket using a ticket reader connected to the PGD B24 to obtain unique ticket information. Next, the PGD B24 sends an EZ pay ticket validation request using the wire-less communication interface to the EZ pay server B26.

In various embodiments, the ticket validation request is composed of one or more information packets compatible with the wire-less communication standard being employed. Using a wireless link B72, the one or more information packets containing the ticket validation request are sent to the transceiver B62 connected to the EZ pay server. The transceiver B62 is designed to receive and send messages from the one or more PGDs B24 in the game playing area B70 in a communication format used by the PGDs. Depending on the location of the PGD B24 in the game playing area B70, the communication path for the information packets to and from the PGD B24 may be through one or more wire-less communication relays including B58 and B60. For example, when the PGD B24 is located near gaming machine B22a, the communication path for a message from the PGD B24 to the EZ pay server B26 may be from the PGD B24 to the relay B60, from the relay B60 to the relay B58, from the relay B58 to the transceiver B62 and from the transceiver B62 to the EZ pay server B26. As the location of the PGD B24 changes in the game playing area B70, the communication path between the PGD B24 and the EZ pay server B26 may change.

After receiving an EZ pay ticket validation reply from the EZ pay server B26, the EZ pay ticket may be validated using an appropriate display screen on the PGD B24. After cashing out the ticket, the game service representative may send a confirmation of the transaction to the EZ pay server B26 using the PGD B24. The transaction history for the PGD B24 may be stored on the PGD B24 as well as the EZ pay server B26. Next, a receipt for the transaction may be printed out. The receipt may be generated from a portable printer carried by the game server representative ad connected to the PGD B24 in some manner or the receipt may be generated from a printer B56 at a fixed location.

After providing a number of game services comprising a number of game service transactions to different game players in the game playing area B70 using the PGD B24, a game service representative may log-off of the PGD B24 and return it to location for secure storage. For example, at the end of a shift, the game service representative may check the PGD B24 at some of the locations, the device is unassigned to the particular game service representative and then may be assigned to another game service representative. However, before the PGD B24 is assigned to another game service representative, the transaction history stored on the PGD B24 may be reconciled with a separate transaction history stored on a transaction server such as the EZ pay server B26.

The assigning and unassigning of the PGD B24 to a game service representative and the transaction reconciliation are performed for security and auditing purposes. Another security measure which may be used on the PGD B24 is a fixed connection time between the PGD B24 and a transaction server. For example, after the PGD B24 has been assigned to a game service representative and the game service representative has logged on the PGD B24, the PGD B24 may establish a connection with one or more transaction servers including the EZ pay server B26, a server B28, a server B30, or a server B32. The connection between a transaction server and the PGD B24 allows the PGD B24 to send information to the transaction server and receive information from the transaction server. The length of this connection may be fixed such that after a certain amount of time the connection between the PGD B24 and the transaction server is automatically terminated. To reconnect to the transaction server, the login and registration process must be repeated on the PGD B24.

A transaction server may provide one or more game service transactions. However, the PGD B24 may connect with multiple transaction servers to obtain different game service transactions. For example, server B30 may be a prize transaction server allowing prize service transactions and server B415 may be a food transaction server allowing food service transactions. When a game service representative receives a prize service request from a game player, the PGD B24 may be used to contact the prize transaction server B30 using a wire-less communication link between the PGD B24 and a transceiver B64 connected to the prize transaction server B30. Similarly, when a game service representative receives a food service request from a game player, the PGD B24 may be used to contact the food transaction server B32 using a wire-less communication link between the PGD B24 and a transceiver B66 connected to the food transaction server B32.

The different transaction servers including the servers B26, B28, B30, B32 may be on separate networks or linked in some manner. For example, server B32 is connected to network B74, server B26 is connected to network B38, server B30 is connected to network B76, and server B28 is connected to network B78. In this embodiment, a network link B80 exists between network B76 and network B38. Thus, server B26 may communicate with server B30 via the network link B80. A communication link between different servers may allow the servers to share game service transaction information and allow different communication paths between the PGDs and the transaction servers. Likewise, a network link B82 exists between network B78 and network B38, permitting the game server to communicate with the EZ pay server B26.

Figure 12:
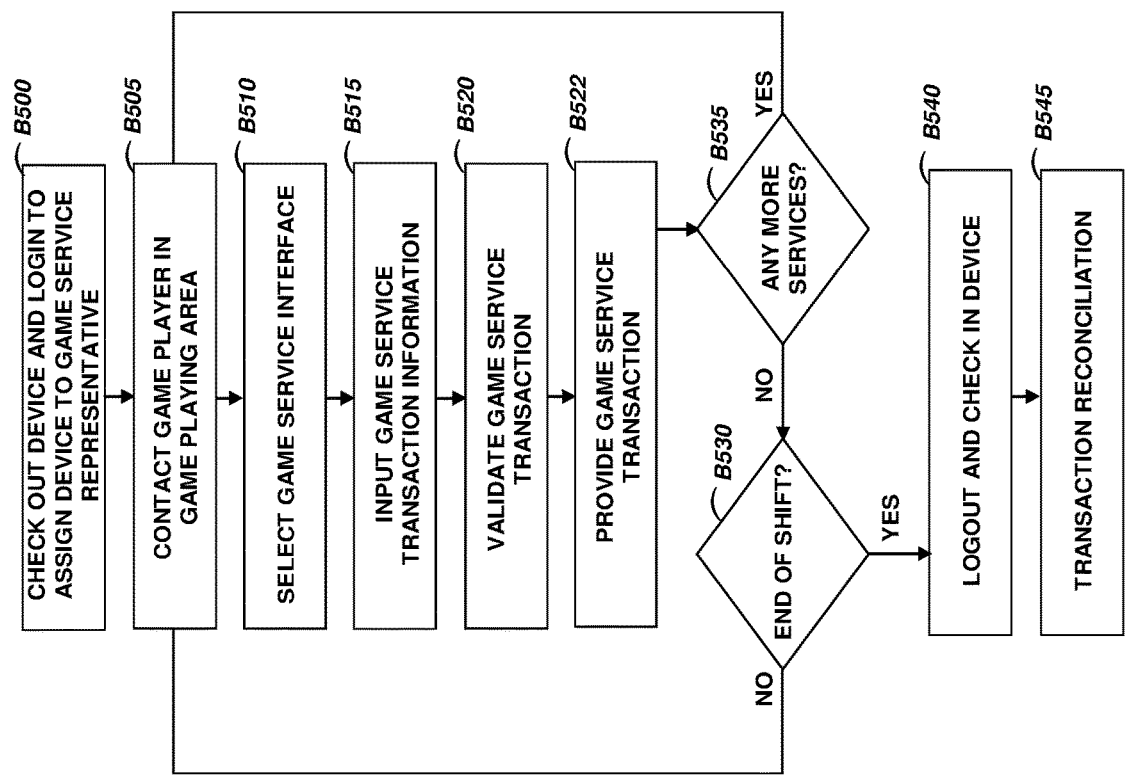
FIG. 12 is a flow diagram of a method of use of the portable gaming device by a gaming service operator, according to some embodiments.

FIG. 12 is a flow chart depicting a method for providing a game service using a hand-held device. In step B500, a game service representative receives the PGD B24 and logs in to the device to assign the device. The check out process and assign process are for security and auditing purposes. In a step B505, the game service representative contacts a game player in the game playing area requesting a game service of some type. In a step B510, the game service representative selects an appropriate interface on the PGD B24 using menus on the display screen B102 of the PGD that allow the game service representative to provide a requested game service. In a step B515, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step B520, the transaction information obtained in step B515 is validated as required. For example, when a player attempts to cash out an award ticket, the information from the award is validated to ensure the ticket is both genuine (e.g. the ticket may be counterfeit) and has not already been validated. The validation process requires a number of transfers of information packets between the PGD B24 and the transaction server. The details of the validation process for an award ticket validation are described with reference to FIG. 13. When the transaction information is valid, in a step B522, a game service transaction is provided. For example, a room reservation may be made for a player requesting an accommodation service. A confirmation of the game service transaction may be sent to the transaction server for transaction reconciliation in a step B545. In one or more embodiments, the method may include the step of generating a receipt regarding the game service transaction.

In a step B535, after providing the service, a game player may request another game service. When a game player requests an additional game service, the game service representative returns to step B510 and selects an appropriate interface for the game service. When a game player does not request an additional service and it is not the end of a shift, in a step B530, the game service representative returns to step B505 and contacts a new game player. In a step B540, when a shift has ended, the game service representative logs out of the PGD B24 and checks the device at a secure location so that the PGD may be assigned to a different game service representative. In step B545, before the PGD B24 is assigned to a different game service representative, a transaction history reconciliation is performed to ensure that the transaction history stored on the PGD is consistent with the transactions previously confirmed with a transaction server during the game service representative's shift. The transaction history on the PGD B24 may be stored on a removable memory storage device on the PGD. Thus, the memory may be removed from the device for transaction reconciliation and replaced with a new memory. Thus, the device with the new memory may be assigned to a new game service representative while the transaction history from the previous game service representative assigned to the device is reconciled.

Figure 13:
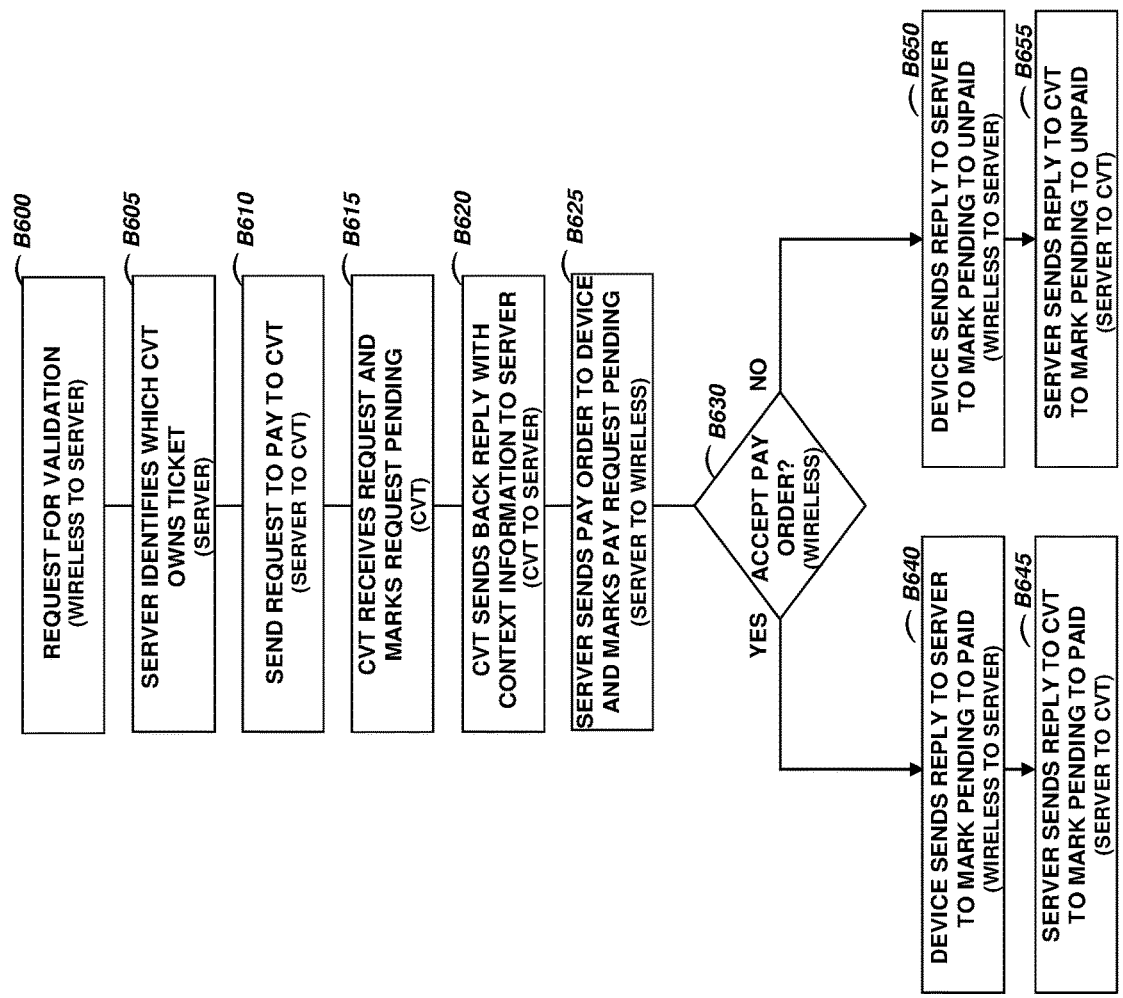
FIG. 13 is a flow diagram of a method of use of the portable gaming device according to some embodiments.

FIG. 13 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In a step B600, a request for game service transaction information read from a ticket is sent via a wire-less communication interface on the PGD B24 to the appropriate transaction server as described with reference to FIG. 8. In a step B605, the server identifies which clerk validation ticket (CVT) B34,B36 owns the ticket. When a CVT owns a ticket, the CVT has stored information regarding the status of a particular ticket issued from a gaming machine connected to the CVT B34,B36. In a step B610, the server sends a request to pay the ticket to the CVT identified as the owner of the ticket. Typically, the pay request indicated a service on the ticket has been requested. For a cash ticket, a pay request means a request to cash out the ticket has been made. For a free meal, a pay request means a request to obtain the meal has been made. In a step B615, the CVT receives the pay request for the ticket and marks the ticket pending. While the ticket is pending, any attempts to validate a ticket with similar information is blocked by the CVT.

In a step B620, the CVT B34,B36 sends back a reply with context information to the server. As an example, the context information may be the time and place when the ticket was issued. The information from the CVT to the server may be sent as one or more data packets according to a communication standard shared by the CVT and server. In a step B625, after receiving the validation reply from the CVT, the server marks the pay request pending and sends a pay order to the PGD B24. While the pay request is pending, the server will not allow another ticket with the same information as the ticket with the pay request pending to be validated.

In a step B630, the game service representative may choose to accept or reject the pay order form the server. When the game service representative accepts the pay order from the server, in a step B640, the PGD B24 sends a reply to the transaction server confirming that the transaction has been performed. The transaction server marks the request paid which prevents another ticket with identical information from being validated. In a step B645, the server sends a confirmation to the CVT which allows the CVT to mark the request from pending to paid. When the game service representative rejects the pay order from the server, in a step B650, the PGD B24 sends a reply to the server to mark the pay request from pending to unpaid. When the ticket is marked unpaid, it may be validated by another PGD B24 or other validation device. In a step B655, the server sends the reply to the CVT to mark the pay request from pending to unpaid which allows the ticket to be validated.

In one or more embodiments of the invention, a ticket may be used to provide credit/value for establishing entitlement to a service or a good, such as the right to play a game or obtain food. The PGD B24 may include a card reader B140. In such an arrangement, a user of the PGD B24 may use a credit card or other magnetic stripe type card for providing credit/value. In various embodiments, the PGD B24 may include one or more other types of devices for obtaining/receiving information, such as a smart card reader. In such arrangements, the PGD B24 device may read information from the credit card, smart card or other device. These cards may comprise the well known credit or debit cards. This information may be used to provide the credit/value. In the example of a credit card, the user's account information may be read from the card and transmitted from the PGD B24 to the controller B42. Credit card/credit validation information may be associated with a credit card server (not shown). This credit card server may be associated with a bank or other entity remote from the casino or place of use of the PGD B24 and the controller B42. A communication link may be provided between the controller B42 and remote server for sending credit card information there over.

In some embodiments, when a player utilizes a smart card or credit card the amount of associated credit or value may be transmitted to the EZ Pay server B26, and then the credited amount may be treated in exactly the same manner as if the credit/value had been provided by a ticket. When a player wishes to cash out, the EZ Pay server B26 has a record of the original amount credited and the amounts of any awards, losses or payments, and may then issue the player a ticket representing the user's total credit.

In accordance with the invention, a gaming system is provided which includes one or more portable gaming devices. The portable gaming devices permit a player to play one or more games at a variety of locations, such as a hotel room, restaurant or other location. These locations may be remote from traditional gaming areas where free-standing, generally stationary gaming machines are located.

In one or more embodiments, a player may use the portable gaming device to not only play games, but obtain other products and services. In addition, in one or more embodiments, the portable gaming device may be used by game service representatives to perform a variety of functions and provide a variety of services to a player.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Wireless Interactive System

According to various embodiments, a wireless interactive gaming system includes one or more wireless gaming devices, a receiver, and a central processor. The wireless interactive gaming system may also include a terminal which is in communication with the central processor.

In a gaming environment that employs a wireless interactive gaming system, a player receives a wireless gaming device from a game official who represents a gaming establishment or the "house". The wireless gaming device is capable of receiving wager information as commands entered by the player and transmitting the received wager information along with identification information to the receiver by wireless transmission.

The wireless interactive gaming system may support a number of wireless gaming devices within one gaming establishment. The range for the wireless transmission from a wireless gaming device may be up to 100 feet.

According to various embodiments, a player inputs information into a wireless gaming device, e.g., by pressing push buttons or keys on the device. The wireless gaming device may include any number, e.g. from 5 to 20, of buttons in a keypad-type arrangement. Buttons may be marked with the digits 0 through 9 and may also include a "$" (dollar sign) key and an "enter" key, so that the player may easily input wager information. In various embodiments, the wireless gaming device includes at least eight player selection buttons (e.g., digits) and at least five special function buttons, (e.g., to request the player's balance). In various embodiments, the player can input some or all of the wager information into the wireless gaming device by swiping a smart card, which contains a microprocessor chip or a magnetic stripe with encoded information, through a smart card reader on the wireless gaming device.

In various embodiments, the wireless gaming device may include an identifier. The identifier may be, e.g., a series of alphanumeric characters, a bar code, or a magnetic stripe affixed to the device. In various embodiments, the identifier may be a digital code stored in a secure memory, e.g., an electronically erasable programmable read only memory (EEPROM). The identifier may thus be readable directly by the game official if it is a series of alphanumeric characters, or it may be read automatically by a bar code reader or a magnetic stripe reader. In various embodiments, the identifier may be programmed in EEPROM or read from EEPROM through an RS-232 port, which may be directly connected to encoder and decoder circuitry in a terminal.

A wireless gaming device may store an encryption key. The encryption key may be used to encrypt information that is transmitted to the receiver from the device. Encryption of the information transmitted to the receiver may limits tampering with the wireless gaming device and may prevent unauthorized or counterfeit devices from being used with the system.

In various embodiments, the encryption key may be stored in the EEPROM. The EEPROM may have the advantage of being a memory device which is difficult to access if the appropriate encoding circuitry is not available. Thus, it is contemplated that the encoding circuitry that downloads the encryption key into the device may be securely held by the game official.

Alternately, the encryption key stored in the EEPROM may be updated and changed for each player who receives a wireless gaming device by directly connecting the device to encoding and decoding circuitry in the terminal through a port at the time the wireless gaming device is delivered to the player. Moreover, other digital information related to the game being played may be downloaded from the terminal to the EEPROM through a direct connection with the wireless gaming device.

In various embodiments, a microprocessor controls the operation of a wireless gaming device. The microprocessor receives digital wager information entered by the player using buttons or keys of the wireless gaming device. The microprocessor stores an identification code associated with the wireless gaming device that is a digital equivalent of the identifier of the wireless gaming device. The microprocessor also executes software applications for encrypting the identification code and the player's wager information for transmission to the receiver. The software contains an algorithm that encrypts a data packet including the identification code and wager information using the encryption key.

In various embodiments, a wireless gaming device has a unique address, i.e. identification code, for communications with the receiver and stores a player identification that is programmed into the device by the central processor. The wireless gaming device may include a wager amount register, which is maintained and updated using the keys on the device. The value stored in the wager amount register may be included in transmissions from the device to the central processor.

The value of the wager amount register may default to a predetermined value, e.g. $1, when the device is initialized, and can be further adjusted by the player. The wireless gaming device may also include an account balance register, which is maintained in the device and is updated by the central processor periodically. The value of the account balance register should default to $0 when the device is initialized.

The wireless gaming device may include player function keys. The player function keys may be used to accomplish the following functions:

Transmit a message to the receiver; 2. Request account balance information; 3. Adjust the state of the device; 4. Affect the data to be sent in the next transmitted message; 5. Increment the wager amount register by a predetermined amount, e.g., $10, $5 or $1; 6. Reset the wager amount register to the default value, e.g., $1.

The firmware of the wireless gaming device may only allow for one press of buttons or keys every 100 ms. In various embodiments, key presses are not queued; thus, when a key press message is queued to be sent, no other player input is accepted until the queued message has been sent.

The wireless gaming device may include a transmitter. The transmitter may receive encrypted digital information from the microprocessor and convert it to a signal for wireless transmission to the receiver. The transmitter transmits signals wirelessly, e.g., using radio frequency signals or infrared signals. Communications between the receiver and the wireless gaming device may be asynchronous at 2400 bits per second.

The wireless gaming device may include an identifying circuit that drives the transmitter to periodically send an identification signal to the receiver. The use of the identifying circuit permits the receiver and the central processor to be assured that the wireless gaming device is still active, functioning and present in the gaming establishment. Thus, if the wireless gaming device were removed from the gaming establishment, the receiver and central processor would no longer receive and detect the periodic identification signal sent by the identifying circuit and the transmitter, and the game official may be alerted that the wireless gaming device has been removed from the gaming establishment.

The wireless gaming device may contain a real-time clock that permits the microprocessor to monitor the current time and date. The clock may consist of a timing circuit. The microprocessor can use the time and date information obtained from clock to perform calculations and other functions based on the current time and date.

The wireless gaming device may also include a tag, such as an electronic or magnetic component, which activates an alarm when passed through a sensing apparatus located at the entrance and/or exit of the gaming establishment. Activation of the alarm by passing the wireless gaming device with the tag through the sensing apparatus notifies the game official of an attempted removal of the wireless gaming device from the gaming establishment.

The wireless gaming device may be powered by a battery source contained within the device. A portable power source such as battery source permits extended cordless operation of the wireless gaming device throughout a gaming environment. The battery source may be part of a removable, rechargeable battery pack that allows the device to be recharged when it is not in use.

In some embodiments, the wireless gaming device displays information such as game information on a device display, such as a liquid crystal display (LCD) with a back-light. The LCD can be used to display the values stored in the wager amount register and in the account balance register. The wireless gaming device may include a display receiver which receives digital information transmitted from the receiver or from the central processor.

The device may also include a bicolor light emitting diode (LED). The bicolor LED is capable of displaying at least two colors, e.g., red and green. The green light may flash each time the wireless gaming device sends a transmission to the receiver, for a period of time to ensure that it is visible to the player. The red light may illuminate when a key is pressed on the wireless gaming device, and remain lit until the transmission is received by the receiver; no additional key entry will be enabled when the red light is lit. The wireless gaming device may also include additional light emitting diodes, for example to indicate when the account balance register is being updated and the balance information is being displayed on the LCD.

The receiver is capable of receiving signals transmitted from the transmitter in the wireless gaming device. The receiver contains a decoder, which converts the received signals, e.g., into digital information. This digital information contains at least the identification code of the wireless gaming device and the player's wager information. The receiver sends the digital information obtained by the decoder to the central processor. Communications between the central processor and the receiver may be by an RS-232 electrical interface data serial communications link, with communications being asynchronous at either 9600 or 19,200 bytes per second, in various embodiments.

The receiver may receive signals from many wireless devices either simultaneously or in rapid succession, e.g., using multiplexing techniques, so that many players can place wagers using their wireless gaming devices during a short time interval. The receiver differentiates signals received from the various devices by the identification codes which are present in the signals received by the receiver.

The central processor receives the identification code of a wireless gaming device and the player's wager information from the receiver. The central processor also decrypts this information using the encryption key. The central processor is capable of receiving data from multiple wireless gaming devices in an apparently simultaneous manner.

In various embodiments, an account for the player is stored in a database of the central processor. The database stores the monetary value of the balance of the account associated with the identifier of the wireless gaming device.

The central processor manages the player's account in the database based on signals received from the player's wireless gaming device as the player places wagers and when prizes are awarded during play of the game. The central processor subtracts money from the player's account balance when the player places a wager. The player's account balance may be automatically increased by the central processor when the player wins a game on which he has placed a wager.

The central processor also stores and is capable of executing software applications containing algorithms to calculate players' account balances, wagers, and winnings. The central processor should be able to execute all of the algorithms which define the actions performed on the players' accounts during the progress of the game, as wagers are entered, as winnings paid out, and when funds are added to the players' accounts.

Algorithms in the software in the central processor may also calculate odds and payouts for certain games, such as lottery-type games, during play of the game. The odds and payouts at a particular point in time may depend on the characteristics of the game being conducted by the central processor, and may change as the game progresses. These algorithms may be executed by the central processor to provide exact calculations of the odds of specific game events occurring and the associated prizes for a player's correctly predicting the occurrence of one of those events. The algorithms may be executed continuously, so that real-time odds and payout can be calculated as the game progresses.

The central processor may perform various actions on players' accounts, resulting in various impacts on the accounts. For example, if the player wins a game, his account is credited for the payout based on his wager. If the player places a wager using the wireless gaming device, his account is debited by the amount of the wager. If the game official receives additional funds from the player, the balance of the player's account is credited by the amount of the funds. If the game official closes the player's account and disburses funds to him, the balance of the player's account is debited by the amount disbursed.

The central processor may be located in the gaming establishment that houses the receiver. In various embodiments, the central processor may be located remotely from the receiver, communicating with the receiver via electronic digital telephone communication or wireless transmission, such as a serial communication link. Additionally, the central processor may perform a multitude of functions for various receivers in a variety of gaming environments.

In some embodiments, communication among the central processor, the receiver, and the wireless gaming device involves a polling scheme. Polling enables many wireless gaming devices to communicate with a receiver without interference between them. Such a polling scheme may include the transmission of digital signals in the form of strings of hexadecimal characters. Preferably, all communications between the central processor, the receiver and the wireless gaming device are encrypted.

In such a polling scheme, hexadecimal characters may be reserved for specific control protocols. For example, an attention character is a header character used to begin all transmissions from the central processor to the receiver, and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

In the polling scheme described above, there are three different modes of communication over the link between the central processor and the receiver. First, the central processor may send messages intended for the receiver. Second, the central processor may send messages intended for the wireless gaming device. Third, the wireless gaming device may send messages intended for the central processor. In various embodiments, messages sent by the central processor may be in the form of a character string formatted with a header character, followed by the identification code of the intended device, the command or message, an end of message character, and a checksum character. Messages received by the receiver or the wireless gaming device may be acknowledged by transmission of an acknowledgement character, but the central processor need not acknowledge messages sent from the wireless gaming devices. Messages sent by the central processor to be received by the wireless gaming device may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by the central processor to the receiver and the wireless gaming device include the following:

Send a device address list to the receiver; 2. Send account balance information to the addressed device; 3. Send command to disable the addressed device; 4. Send command to enable the addressed device.

In various embodiments, messages sent between the receiver and the wireless gaming device may be in the form of a character string formatted with a header character, followed by the identification code of the intended device, the current wager amount, the request, command or data, an end of message character, and a checksum character. Command codes for requests, commands and data sent between the receiver and the wireless gaming device include the following:

Read user identification; 2. Read device address; 3. Read balance register; 4. Read wager amount register; 5. Provide device status; 6. Write user identification; 7. Write device address; 8. Write balance register; 9. Write wager amount; 10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte and the most significant byte, allowing for the use a greater range of numbers for these values.

Various embodiments include methods by which the central processor communicates with a wireless gaming device. The central processor transmits a string of hexadecimal characters, including, e.g., a header character, followed by the device's identification code, followed by a request, command or data, followed by an end of message character, followed by a checksum character. After the central processor transmits the character string, the wireless gaming device receives the string, recognizes its identification code, and executes any instructions in the string. When the central processor sends an instruction to all wireless gaming devices simultaneously, all currently active devices receive and execute the instruction. The wireless gaming device does not send an acknowledgement message to the central processor, although the receiver may receive a transmission from the wireless gaming device that the instruction was received properly. The central processor also communicates with the receiver in a similar manner, except that the receiver may send an acknowledgement message to the central processor which includes the acknowledgement control protocol character.

Similarly, the wireless gaming device communicates with the receiver and the central processor using, e.g., hexadecimal character strings. The receiver regularly and periodically polls the active wireless gaming device for information requests or wagering requests. If the player has entered a request into the wireless gaming device since the last time the wireless gaming device was polled, then the player's request will be transmitted to the receiver.

Various embodiments include methods by which the wireless gaming device receives and relays player requests to the central processor. First, the player enters a request into the wireless gaming device using buttons or keys. The player then presses a button labeled, e.g., "enter" or "send," instructing the wireless gaming device to send the request the next time the receiver polls the wireless gaming device. When this button has been pressed, the red light of the bicolor LED is illuminated, thereby informing the player that the request is waiting to be sent. The request is converted into a hexadecimal character string, including, e.g., a header character, an identification code (or, alternatively, a separate identification string reserved for a specific player), the current wager amount, the player's request (e.g., to change the wager amount or to send a balance update), an end of message character, and a checksum character. The next time the receiver polls the device, the transmitter of the device transmits the character string to the receiver. When the wireless gaming device is polled by the receiver, the green light of bicolor LED flashes, informing the player that the request has been transmitted. The receiver receives the request string, and transmits the string to the central processor. The central processor then acts on the player's request.

Using the terminal, the game official may process wagering transactions and distribute wireless gaming devices. In various embodiments, the terminal may include a bar code reader and/or a magnetic stripe reader for rapid entry of the identifier of a wireless gaming device prior to delivering the wireless gaming device to the player. Reading devices provide information in the form of digital data to the terminal. The terminal includes a keyboard by which the game official can manually enter data to be sent to the central processor. Using either reading device, the keyboard, or a combination of these, the game official communicates with the central processor to establish a player's account, increase the balance of the account when the player tenders funds to the game official, and decrease the balance of the account when the player seeks to collect the cash value of his account balance.

The player establishes a balance of the account associated with his wireless gaming device, identified by an identifier, when he receives the wireless gaming device from the game official. The player may increase the monetary value of the balance of the account by paying additional funds, in the form of cash or credit, to the game official, who accesses the account stored in the central processor through the terminal to increase the balance of the account.

The wireless gaming device is returned to the game official after the player has played one or more games. The readers may be used to read the identifier for closing out the player's account stored in the database of the central processor. The terminal includes a terminal display which notifies the game official of the balance of the player's account, so that the player may be paid the cash value of the remaining balance of his account.

In some embodiments, an account status display device is located in the gaming establishment to display players' account information. In various embodiments, the display device may be, e.g., a liquid crystal display or a cathode ray tube display. The display device is controlled by the central processor, which sends information to the display device for display to the players.

A player may look at the display device to confirm that wagers transmitted from the wireless gaming device were received by the receiver and sent to the central processor, to determine the monetary balance of the player's account, and to verify that the player's winnings have been credited to his account. The display device displays key information necessary for a player to participate in a game. The information displayed for each player may include the account number, the player's account balance, the player's last wager, and the player's last prize award or win.

The display device is divided into specific areas, e.g., a display area, each area showing the account information for one player. The size of the display area may be determined by the size of the display device and the number of players who possess wireless display devices. It is contemplated that only active accounts will be displayed on the display device. If additional display devices are required to display the information concerning a large number of accounts, the central processor may be configured to drive multiple similar display devices.

The display device may also be used to display the odds and payouts for game wagers. Alternately, a separate display device driven by the central processor may be used to display the odds and payout information. Further, the odds and payouts may be displayed on the device display 21.

Procedures for using the wireless interactive gaming system, according to some embodiments, are now described. In some embodiments, a player tenders money in the form of cash or credit, e.g., $100, to a game official in the gaming establishment to establish an account. The game official chooses a wireless gaming device and uses, e.g., the bar code reader on the terminal to enter the identifier of the wireless gaming device into the terminal. The game official also inputs the amount of money tendered, i.e. $100, into the terminal via keyboard. The game official hands the wireless gaming device to the player and tells the player that his account is, e.g., Account No. 12. Alternately, the player may identify his account number directly from the identifier on the wireless gaming device. The information entered by the game official into the terminal is sent to the central processor, which establishes an account record for the player in the database.

For this example, the central processor may be conducting a racing game in which players choose a winning racing element on which to place a wager for the next racing game to be displayed in the gaming establishment. To place a wager, the player presses buttons on the wireless gaming device.

In some embodiments, the player first presses the button that corresponds to the number assigned to the racing element that he chooses, e.g., "3", and then the wager amount, e.g., "$" and "5", for a $5 wager. The player then presses the "enter" key to transmit his wager to the central processor.

In an alternate embodiment, the game may be simplified so that all wagers are placed for a fixed amount, e.g., $1, by pressing a single button on the wireless gaming device. By pressing the button that corresponds to the number assigned to the chosen racing element, e.g., "3", the player places a $1 bet on racing element number 3. The player can then place a larger wager on racing element number 3, by pressing the "3" button the number of times corresponding to the number of $1 bets he desires to make, e.g., by pressing "3" five times to wager $5 on racing element number 3.

Each time the player enters a wager, the wireless gaming device forms a data packet containing the player's wager information and the identification code of the wireless gaming device. The data packet is encrypted and transmitted by the transmitter via wireless communication.

The decoder in the receiver receives the encrypted data packet transmitted by the transmitter. The encrypted data packet is sent to the central processor, where it is decrypted. The central processor uses the information it has obtained to update the player's account in the database by subtracting the wagered amount from the player's account balance and registers the player's wager on the game.

After the game has been played, the central processor awards prizes to winning players based on the wagers they have made and the odds associated with the winning outcome of the game. If the player in possession of the wireless gaming device is a winner, the central computer updates the player's account in the database by adding the monetary amount of the prize to the player's account balance. Otherwise, the player's account remains unchanged.

When the player has finished playing games in the gaming establishment, he returns the wireless gaming device to the game official. The game official again inputs the identifier of the wireless gaming device into the terminal, e.g., by using the bar code reader of the terminal. The terminal accesses the player's account information stored in the database of the central processor to obtain the player's remaining account balance. The terminal display displays the player's remaining account balance to the game official, who then tenders the monetary value of that amount to the player. The account is closed, and the transaction is recorded in the central processor.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Hand-Held Wireless Game Player

Various embodiments include a hand-held wireless game player for playing a game of chance. The hand-held wireless game player may be generally characterized as including: 1) a wire-less communication interface; 2) a display screen; 3) one or more input mechanisms; and 4) a microprocessor configured i) to present the game of chance on the display screen using operating instructions received via the wireless communication interface from a master gaming controller located on a gaming machine and ii) to send information from input signals generated from the one or more input mechanisms to the master gaming controller via the wireless communication interface. The wireless game player may be played in a plurality of venue locations physically separate from the location of the gaming machine where the plurality of venue locations are selected from the group consisting of a keno parlor, a bingo parlor, a restaurant, a sports book, a bar, a hotel, a pool area and a casino floor area. The game of chance played on the wireless game player may be selected from the group consisting of slot games, poker, pachinko, multiple hand poker games, pai-gow poker, black jack, keno, bingo, roulette, craps and a card game. Other games are also contemplated, in various embodiments.

In various embodiments, the wireless communication interface may use a wireless communication protocol selected from the group consisting of IEEE 802.11a, IEEE 802.11b, IEEE 802.11x, hyperlan/2, Bluetooth, and HomeRF. The wireless game player may also comprise a wire network interface for connecting the wireless game player to a wire network access point. In addition, the wireless game player may also comprise a peripheral interface for connecting to a peripheral gaming device where the peripheral interface is a serial interface, a parallel interface, a USB interface, a FireWire interface, an IEEE 1394 interface. The peripheral gaming device may be a printer, a card reader, a hard drive and a CD-DVD drive.

In various embodiments, the one or more inputs mechanisms on the wireless game player may be selected from the group consisting of a touch screen, an input switch, an input button and biometric input device where the biometric input device may be a finger print reader. The wireless game player may also include a detachable memory interface designed to receive a detachable memory where the detachable memory unit stores graphical programs for one or more games of chance played on the wireless game player. The wireless game player may also comprise one or more of the following: 1) an audio output interface for receiving a head phone jack, 2) an antenna, 3) a sound projection device, 4) a battery, 5) a power interface for supplying power to the wireless game player from an external power source and for charging the battery from the external power source, 6) a memory unit where the memory unit may store graphical programs for one or more games of chance played on the wireless game player, 7) an electronic key interface designed to receive an electronic key, and 8) a video graphics card for rendering images on the display screen where the video graphics card may be used to render 2-D graphics and 3-D graphics.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

The following are embodiments, not claims:

A method comprising:

receiving an indication of a price of an item to be purchased by a person from a merchant;

receiving an indication of an amount tendered by the person;

determining an amount of change due to the person based on the price and based on the amount tendered;

determining the rules of a game;

generating a third outcome of the game using a random number generator;

determining based on the rules whether the third outcome is winning or losing;

authorizing, if the third outcome is winning, that the amount tendered be returned to the person and that the person be allowed to keep the item; and authorizing, if the third outcome is losing, that the amount tendered be kept by the merchant.

B. The method of embodiment A in which determining the rules of a game includes determining the rules of a game in which the person will bet the amount of change due for a chance to win the item, wherein the rules specify a first outcome that is winning and a second outcome that is losing;

C. The method of embodiment A in which the indication of the amount owed is received from a mobile gaming device.D. A method comprising:

receiving an indication of an item to be purchased by a person;

determining a purchase price for the item;

receiving an indication of an amount tendered by the person;

determining an amount of change due based on the purchase price and the amount tendered;

determining an outcome of a game in which the amount of change due has been used as a bet in the game; and authorizing, if the outcome is a winning outcome, that the person receive the item and that the entire amount tendered be returned to the person.

E. The method of embodiment D in which determining an amount of change due includes determining a difference between the amount tendered and the purchase price.F. The method of embodiment D in which the purchase price includes a tax.G. The method of embodiment D in which determining the outcome of the game includes generating the outcome of the game using a random number generator.H. The method of embodiment D in which determining the outcome of the game includes receiving from a mobile gaming device an indication of the outcome of the game.I. The method of embodiment D in which determining the outcome of the game includes receiving from a casino server an indication of the outcome of the game.J. The method of embodiment D in which receiving an indication of an amount tendered by the person includes receiving from a mobile gaming device an indication of an amount tendered by the person.K. The method of embodiment D in which receiving an indication of an amount tendered by the person includes receiving from a mobile gaming device an indication of a number of gaming credits tendered by the person.L. The method of embodiment D in which receiving an indication of an amount tendered by the person includes receiving from a mobile gaming device an indication of a number of credits tendered by the person from a balance of credits dedicated to non-gaming activities.M. The method of embodiment D further including recording at least one of: (a) the purchase price; (b) the amount tendered; (c) the amount of change due; (d) the outcome of the game; (e) the indication of the item to be purchased; (f) whether the amount tendered was returned to the person; and (g) whether the amount tendered was not returned to the person.N. A method comprising:

receiving an indication of an item to be purchased by a person;

determining a purchase price for the item;

determining a number of gaming credits whose aggregate value exceeds the purchase price;

receiving an authorization from the person to use the number of gaming credits to make the purchase;

determining an amount of change due based on the purchase price and the aggregate value;

determining an outcome of a game in which the amount of change due has been used as a bet in the game;

displaying, if the outcome is a winning outcome, a message indicating that the item has been won without the necessity of payment; and displaying, if the outcome is a losing outcome, a message indicating that the person has lost the amount of change due.

O. The method of embodiment N further including:

authorizing the deduction of the number of gaming credits from a credit balance associated with the person; and updating a display of the credit balance to reflect the reduced number of gaming credits in the credit balance.

P. The method of embodiment N further including:

receiving, if the outcome is a winning outcome, an indication that the number of gaming credits is to be restored to the credit balance associated with the person; and updating, if the outcome is a winning outcome, the display of the credit balance to reflect the increased number gaming credits in the credit balance.

Q. The method of embodiment N in which determining an outcome of the game includes generating the outcome of the game using a random number generator.R. The method of embodiment N in which determining an outcome of the game includes receiving from a POS terminal an indication of the outcome of the game.S. The method of embodiment N in which determining an outcome of the game includes receiving from a casino server an indication of the outcome of the game.

INCORPORATION BY REFERENCE

The following are incorporated by reference herein:

U.S. Pat. Nos. 6,676,522; 6,846,238; 6,702,672. The following sections I-X provide a guide to interpreting the present application.

Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. .sctn. 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. .SCTN. 112 PARAGRAPH 6

In a claim, a limitation of the claim which includes the phrase "means for" or the phrase "step for" means that 35 U.S.C. .sctn. 112, paragraph 6, applies to that limitation.

In a claim, a limitation of the claim which does not include the phrase "means for" or the phrase "step for" means that 35 U.S.C. .sctn. 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35U.S.C. .sctn. 112, paragraph 6, applies to that step(s).

With respect to a means or a step for performing a specified function in accordance with 35 U.S.C. .sctn. 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. .sctn. 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description in accordance with 35 U.S.C. .sctn. 112, paragraph 1 and enablement in accordance with 35 U.S.C. .sctn. 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

The invention claimed is:

1. A mobile device comprising:
a memory;
at least one processor to:
  detect a plurality of cash registers within a predetermined proximity of the mobile device;
  transmit a signal to each of the cash registers;
  receive the signal from each of the cash registers;

identify which cash register is nearest to the mobile device based on an elapsed time between transmission of each signal and receipt of each signal;

select, based on the elapsed time, the cash register nearest to the mobile device for an opportunity to play a game;

in response to determining that more than one cash register are approximately nearest to the cash register, execute a tie breaking scheme to select one of the nearest cash registers; and transmit, to a selected nearest cash register, an indication that an item is being purchased via the mobile device receive, from the selected nearest cash register, information indicative of the opportunity to play the game.

2. The mobile device of claim 1, wherein the predetermined proximity is approximately thirty feet.

3. The mobile device of claim 1, wherein the at least one processor is further configured to transmit, to the selected nearest cash register, an instruction to initiate the game.

4. The mobile device of claim 1, wherein to execute the tie breaking scheme the at least one processor is configured to select one of the nearest cash registers randomly.

5. The mobile device of claim 1, wherein to execute the tie breaking scheme the at least one processor is configured to select a cash register that is not currently involved in a transaction.

6. The mobile device of claim 1, wherein to execute the tie breaking scheme the at least one processor is configured to select a cash register based on a predetermined priority scheme.

7. The mobile device of claim 1, wherein the at least one processor is configured to establish an exclusive communication channel with the selected nearest cash register.

8. The mobile device of claim 1, wherein the at least one processor is configured to detect a beacon emitted from the plurality of cash registers.

9. A method comprising:

detecting, by at least one processor, a plurality of cash registers within a predetermined proximity of a mobile device;

transmitting, by the at least one processor, a signal to each of the cash registers;

receiving, by the at least one processor, the signal from each of the cash registers;

identifying, by the at least one processor, which cash register is nearest to the mobile device based on an elapsed time between transmission of each signal and receipt of each signal;

selecting, by the at least one processor, the cash register nearest to the mobile device based on the elapsed time for an opportunity to play a game;

in response to determining that more than one cash register are approximately nearest to the cash register, executing, by the at least one processor, a tie breaking scheme to select one of the nearest cash registers;

transmitting, by the at least one processor, an indication to the selected nearest cash register that an item is being purchased via the mobile device; and receiving, by the at least one processor, information from the selected nearest cash register indicative of the opportunity to play the game.

10. The method of claim 9, wherein the predetermined proximity is approximately thirty feet.

11. The method of claim 9, further comprising transmitting, by the at least one processor, a game initiation instruction to the selected nearest cash register.

12. The method of claim 9, wherein executing the tie breaking scheme comprises selecting, by the at least one processor, a cash register randomly.

13. The method of claim 9, wherein executing the tie breaking scheme comprises selecting, by the at least one processor, a cash register that is not currently involved in a transaction.

14. The method of claim 9, wherein executing the tie breaking scheme comprises selecting, by the at least one processor, a cash register based on a predetermined priority scheme.

15. The method of claim 9, further comprises establishing, by the at least one processor, an exclusive communication channel with the selected nearest cash register.

16. The method of claim 9, further comprises detecting, by the at least one processor, a beacon emitted from the plurality of cash registers.

* * * * *